US012540891B1

(12) United States Patent
Clark et al.

(10) Patent No.: US 12,540,891 B1
(45) Date of Patent: Feb. 3, 2026

(54) METHOD AND APPARATUS FOR MEASURING EXTINCTION USING AN UNMANNED AERIAL VEHICLE

(71) Applicants: Alexis Henry Clark, Owens Crossroads, AL (US); Steven Fiorino, Beavercreek, OH (US); Kevin Keefer, Centerville, OH (US)

(72) Inventors: Alexis Henry Clark, Owens Crossroads, AL (US); Steven Fiorino, Beavercreek, OH (US); Kevin Keefer, Centerville, OH (US)

(73) Assignee: BlueHalo, LLC, Huntsville, AL (US)

( * ) Notice: Subject to any disclaimer, the term of this patent is extended or adjusted under 35 U.S.C. 154(b) by 357 days.

(21) Appl. No.: 18/100,540

(22) Filed: Jan. 23, 2023

Related U.S. Application Data

(60) Provisional application No. 63/302,381, filed on Jan. 24, 2022.

(51) Int. Cl.
*G01N 15/06* (2024.01)
*B64U 10/14* (2023.01)
(Continued)

(52) U.S. Cl.
CPC ......... *G01N 15/0637* (2013.01); *B64U 10/14* (2023.01); *G01N 1/2214* (2013.01);
(Continued)

(58) Field of Classification Search
CPC ............. G01N 15/0637; G01N 1/2214; G01N 1/2273; G01N 15/02; G01N 2001/021;
(Continued)

(56) References Cited

U.S. PATENT DOCUMENTS 3,465,339 A * 9/1969 Marner ................. G01K 1/024
73/170.27
3,665,467 A * 5/1972 Haroules ................ G01W 1/00
455/303
(Continued)

FOREIGN PATENT DOCUMENTS

CN 108693377 A * 10/2018 ............. G01K 11/22
GB 1164688 A * 9/1969 ................ G01J 5/00
(Continued)

OTHER PUBLICATIONS

Tommaso Francesco Villa et al., An Overview of Small Unmanned Aerial Vehicles for Air Quality Measurements: Present Applications and Future Prospectives, Sensors (Basel). Jul. 12, 2016;16(7):1072. doi: 10.3390/s16071072 (Year: 2016).*
(Continued)

*Primary Examiner* — Stephanie E Bloss
*Assistant Examiner* — Kevin C Butler
(74) *Attorney, Agent, or Firm* — Amster, Rothstein & Ebenstein LLP

(57) ABSTRACT

A method and apparatus used to determine atmospheric extinction coefficients in conjunction with an unmanned aerial vehicle are provided. The unmanned aerial vehicle may include a central body, at least one motor operatively connected to the central body, a condensation particle detection payload, and a data acquisition board including memory operatively connected to the data acquisition board, and a processor configured to generate extinction information.

17 Claims, 24 Drawing Sheets

(51) Int. Cl.
  *B64U 101/00* (2023.01)
  *G01N 1/02* (2006.01)
  *G01N 1/22* (2006.01)
  *G01N 15/00* (2024.01)
  *G01N 15/02* (2024.01)

(52) U.S. Cl.
  CPC ........... *G01N 1/2273* (2013.01); *G01N 15/02* (2013.01); *B64U 2101/00* (2023.01); *G01N 2001/021* (2013.01); *G01N 2001/2291* (2013.01); *G01N 2015/0046* (2013.01); *G01N 2015/0681* (2013.01)

(58) Field of Classification Search
  CPC ... G01N 2015/0046; G01N 2015/0681; B64U 10/14; B64U 2101/00
  USPC ........................................................ 73/28.01
  See application file for complete search history.

(56) References Cited

U.S. PATENT DOCUMENTS

| | | | | |
|---|---|---|---|---|
| 5,639,954 | A * | 6/1997 | Crothers | B23K 1/203 73/1.01 |
| 5,639,964 | A * | 6/1997 | Djorup | G01P 5/12 73/861.85 |
| 9,845,165 | B2 * | 12/2017 | Michalski | B64U 70/90 |
| 11,703,437 | B2 * | 7/2023 | Rostedt | B03C 3/368 73/28.01 |
| 11,879,981 | B2 * | 1/2024 | Smolin | G01K 3/14 |
| 2009/0257067 | A1 * | 10/2009 | Chapman | G01B 9/02029 356/498 |
| 2013/0314694 | A1 * | 11/2013 | Tchoryk, Jr. | G01S 17/58 356/28.5 |
| 2019/0377093 | A1 * | 12/2019 | Wiebold | G01S 17/95 |
| 2021/0125348 | A1 * | 4/2021 | Bose-Pillai | G06T 7/248 |
| 2022/0091007 | A1 * | 3/2022 | Fan | G01N 21/538 |
| 2024/0344955 | A1 * | 10/2024 | Jen | G01N 15/065 |

FOREIGN PATENT DOCUMENTS

| | | | | |
|---|---|---|---|---|
| KR | 20170035769 A | * | 3/2017 | ............ G01N 1/24 |
| KR | 20210125821 A | * | 10/2021 | ............ B64C 39/02 |
| RU | 2735909 C1 | * | 11/2020 | |
| WO | 1992004698 A1 | | 3/1992 | |
| WO | WO-9204698 A | * | 3/1992 | ............ G01W 1/02 |
| WO | 1997033187 A1 | | 9/1997 | |
| WO | WO-9733187 A1 | * | 9/1997 | ............ G01J 5/0014 |
| WO | 2000007677 A1 | | 2/2000 | |
| WO | WO-0007677 A1 | * | 2/2000 | ............ G01S 11/02 |
| WO | WO-2012105973 A1 | * | 8/2012 | ............ G01N 21/45 |
| WO | WO-2019012185 A1 | * | 1/2019 | ............ B03C 3/017 |
| WO | 2020257859 A1 | | 12/2020 | |

OTHER PUBLICATIONS

Martin et al., Meteorological profiling of the lower troposphere using the research UAV "M2AV Carolo",Atmos. Meas. Tech., 4, 705-716, 2011 www.atmos-meas-tech.net/4/705/2011/ doi:10.5194/amt-4-705-2011 (Year: 2011).*

Alvarado et al., A Methodology to Monitor Airborne PM10 Dust Particles Using a Small Unmanned Aerial Vehicle, Sensors 2017, 17, 343; doi:10.3390/s17020343 (Year: 2017).*

Sabatini et al., Novel atmospheric extinction measurement techniques for aerospace laser system applications, Infrared Physics & Technology 56 (2013) 30-50 (Year: 2013).*

Santos et al., Unmanned Aerial Vehicle tracking using a Particle Filter based approach, Conference: 2019 IEEE Underwater Technology (UT), DOI: 10.1109/UT.2019.8734465, Apr. 2019 (Year: 2019).*

Altstädter et al., An unmanned research aircraft for observing vertical and horizontal distributions of ultrafine particles within the atmospheric boundary layer. Atmos. Meas. Tech. Discussions 2014, 7, 12283-12322 (Year: 2014).*

Danilov et al., The System of the Ecological Monitoring of Environment which is Based on the Usage of UAV, ISSN 10674136, Russian Journal of Ecology, 2015, vol. 46, No. 1, pp. 14-19. © Pleiades Publishing, Ltd., 2015 (Year: 2015).*

* cited by examiner

FIG. 6B

| Altimeter | From Particle Detection Payload | | | | | | | | | | |
|---|---|---|---|---|---|---|---|---|---|---|---|
| Altitude (m) | Particle Number Concentration (#/cm3) | Temperature of the Conditioner (C) | Temperature at the RH Sensor (C) | Temperature of the Moderator (C) | Temperature at the Optics Head (C) | Temperature at the Heat Sink (C) | Measured Dead Time (Fraction of interval * 10000) | Flow Rate (cm3/min) | Absolute Pressure (mbar) | Raw Counts at Lower Detection Threshold | Raw Counts at Higher Detection Threshold |
| ALT | NCC | Tcon | Trhi | Tmod | Topt | Thsk | MDT | QCCM | Pabs | LTH | HTH |
| 170.8125 | 2928 | 16.1 | 49.5 | 19.8 | 35.2 | 32 | 360 | 306 | 987 | 14333 | 14358 |
| 170.8125 | 2928 | 16.1 | 49.5 | 19.8 | 35.2 | 32 | 360 | 306 | 987 | 14333 | 14358 |
| 170.8125 | 2928 | 16.1 | 49.5 | 19.8 | 35.2 | 32 | 360 | 306 | 987 | 14333 | 14358 |
| 170.125 | 2928 | 16.1 | 49.5 | 19.8 | 35.2 | 32 | 360 | 306 | 987 | 14333 | 14358 |
| 170.125 | 2928 | 16.1 | 49.5 | 19.8 | 35.2 | 32 | 360 | 306 | 987 | 14333 | 14358 |
| 170.125 | 2928 | 16.1 | 49.5 | 19.8 | 35.2 | 32 | 360 | 306 | 987 | 14333 | 14358 |
| 170.3125 | 2928 | 16.1 | 49.5 | 19.8 | 35.2 | 32 | 360 | 306 | 987 | 14333 | 14358 |
| 170.3125 | 2928 | 16.1 | 49.5 | 19.8 | 35.2 | 32 | 360 | 306 | 987 | 14333 | 14358 |
| 170.3125 | 2928 | 16.1 | 49.5 | 19.8 | 35.2 | 32 | 360 | 306 | 987 | 14333 | 14358 |
| 170.0625 | 2928 | 16.1 | 49.5 | 19.8 | 35.2 | 32 | 360 | 306 | 987 | 14333 | 14358 |
| 170.0625 | 2928 | 16.1 | 49.5 | 19.8 | 35.2 | 32 | 360 | 306 | 987 | 14333 | 14358 |
| 170.0625 | 2928 | 16.1 | 49.5 | 19.8 | 35.2 | 32 | 360 | 306 | 987 | 14333 | 14358 |
| 170.125 | 2928 | 16.1 | 49.5 | 19.8 | 35.2 | 32 | 360 | 306 | 987 | 14333 | 14358 |
| 170.125 | 2928 | 16.1 | 49.5 | 19.8 | 35.2 | 32 | 360 | 306 | 987 | 14333 | 14358 |
| 170.125 | 2928 | 16.1 | 49.5 | 19.8 | 35.2 | 32 | 360 | 306 | 987 | 14333 | 14358 |
| 169.625 | 2928 | 16.1 | 49.5 | 19.8 | 35.2 | 32 | 360 | 306 | 987 | 14333 | 14358 |
| 169.625 | 2928 | 16.1 | 49.5 | 19.8 | 35.2 | 32 | 360 | 306 | 987 | 14333 | 14358 |
| 169.625 | 2928 | 16.1 | 49.5 | 19.8 | 35.2 | 32 | 360 | 306 | 987 | 14333 | 14358 |
| 169.75 | 2928 | 16.1 | 49.5 | 19.8 | 35.2 | 32 | 360 | 306 | 987 | 14333 | 14358 |
| 169.75 | 2928 | 16.1 | 49.5 | 19.8 | 35.2 | 32 | 360 | 306 | 987 | 14333 | 14358 |
| 169.75 | 2928 | 16.1 | 49.5 | 19.8 | 35.2 | 32 | 360 | 306 | 987 | 14333 | 14358 |
| 169.75 | 2928 | 16.1 | 49.5 | 19.8 | 35.2 | 32 | 360 | 306 | 987 | 14333 | 14358 |
| 169.75 | 2928 | 16.1 | 49.5 | 19.8 | 35.2 | 32 | 360 | 306 | 987 | 14333 | 14358 |

FIG. 6C

S800: generating, by a condensation particle detection payload operatively connected to a data acquisition board, both of which are mounted on an unmanned aerial vehicle, first particle count information S802: generating, by a first humidity sensor mounted on the unmanned aerial vehicle and operatively connected to the data acquisition board, first relative humidity information associated with a first relative humidity S804: transmitting, from the condensation particle detection payload to the data acquisition board, the first particle count information S806: transmitting, from the first humidity sensor to the data acquisition board, the first relative humidity information S808: storing, in memory operatively connected to the data acquisition board, the first particle count information and the first relative humidity information S810: determining, by the data acquisition board, first particle size information based on the first relative humidity information

CONTINUED WITH S812 of FIG. 8B

FIG. 8A

S800: generating, by a condensation particle detection payload operatively connected to a data acquisition board, both of which are mounted on the unmanned aerial vehicle, first particle count information S800A: ingesting, by an inlet of the condensation particle detection payload, a first air sample at a first volumetric flow rate S800B: cooling, by a conditioner of the condensation particle detection payload enclosing the wick, the first air sample S800C: condensing, by the conditioner, the plurality of water vapor particles to form a plurality of liquid water particles S800D: heating, by an initiator of the condensation particle detection payload enclosing the wick, the first air sample and the plurality of liquid water particles to supersaturate the first air sample S800E: enlarging, by a growth component of the condensation particle detection payload, the heated plurality of atmospheric aerosol particles and recycling the plurality of liquid water particles to the wick S800F: determining, by a detector of the condensation particle detection payload, the first particle count information associ

METHOD AND APPARATUS FOR MEASURING EXTINCTION USING AN UNMANNED AERIAL VEHICLE

REFERENCE TO RELATED APPLICATIONS

The present application claims the benefit and priority to U.S. Provisional Patent Application No. 63/302,381, filed on Jan. 24, 2022, and entitled "METHOD AND APPARATUS FOR MEASURING EXTINCTION USING AN UNMANNED AERIAL VEHICLE", the entire contents of which are incorporated by reference herein.

This application also relates to U.S. Provisional Patent Application Ser. No. 63/260,042, filed on Aug. 6, 2021 entitled "METHOD AND APPARATUS FOR MEASURING OPTICAL TURBULENCE USING AN UNMANNED AERIAL VEHICLE", which relates to U.S. patent application Ser. No. 15/997,304, filed on Jun. 4, 2018 entitled "ATMOSPHERIC CHARACTERIZATION SYSTEMS AND METHODS", which claims priority to and the benefit of U.S. Provisional Patent Application Ser. No. 62/515,299, filed on Jun. 5, 2017 entitled "ATMOSPHERIC CHARACTERIZATION SYSTEMS AND METHODS", the entire content of each of which is hereby incorporated by reference herein.

FIELD OF THE INVENTION

The present invention generally relates to methods and apparatus used to determine atmospheric extinction coefficients utilizing an unmanned aerial vehicle to obtain in situ measurements.

BACKGROUND

For successful daytime imaging and detection, it is extremely important to be able to quantify the solar background noise of the sky in the ultraviolet (UV) to shortwave infrared (SWIR) range of the electromagnetic (EM) spectrum. Multiple-scattering effects can significantly impact radiative transfer calculations for remote sensing and directed-energy applications. Therefore, accurate characterization of meteorological parameters and radiative transfer effects within the atmospheric boundary layer and upper-air regions is necessary in order to account for such scattering effects and to generate accurate optical transmission information. Conventional atmospheric characterization tools use surface observations or climatological values of temperature, pressure, and humidity, such as numerical weather prediction (NWP) data as inputs for calculating scattering effects. For example, the Global Aerosol Data Set (GADS; Koepke et al. 1997) provides aerosol constituent number densities on a 5°×5° grid worldwide based on time of day and season. Additionally, the Extreme and Percentile Environmental Reference Tables (ExPERT) database provides probabilistic atmospheric data for the atmospheric vertical profile data at a number of land surface sites. However, each of these conventional atmospheric database tools provides only approximations for important atmospheric characterization information used to determine multiple-scattering effects, including aerosol particle count, temperature, pressure, and relative humidity, to name a few. This causes significant error in calculations applying such information including for generating extinction information caused by aerosols in the atmosphere.

Other conventional atmospheric characterization tools use surface observations in combination with the NWP data in order to extrapolate more accurate probabilistic climatology as an input for such calculations and related applications. And while such techniques have proven to be more accurate than using only NWP data, the inability to measure real-time information continues to cause error in subsequent calculations which apply the climatological profile. Further, both of these conventional techniques fail to account for anomalous weather conditions when measuring atmospheric characterization information, such as smoke or other artificially created atmospheric disturbances.

Existing unmanned aerial vehicles have been used in conjunction with weather measurement devices which together are able to generate temperature, pressure, and humidity information, to name a few, at various corresponding heights. However, existing payloads for use with such unmanned aerial vehicles were not capable of detecting particles, and particularly particles of less than 10 microns, in situ and in real time.

What is needed is a tool which is able to generate precise in situ atmospheric characterization information, including volumetric particle count information, in real time across a vertical and horizontal profile in order to maximize transmission capabilities for optical applications.

SUMMARY OF INVENTION

In view of the above, it is the object of the present disclosure to provide method and apparatus to overcome the technological challenges faced in conventional atmospheric characterization systems. The present disclosure provides for methods and apparatuses for determining atmospheric extinction coefficients utilizing an unmanned aerial vehicle to obtain in situ measurements in order to increase the accuracy of radiative transfer calculations and directed energy applications.

According to an exemplary embodiment of the invention, there is an unmanned aerial vehicle having (a) a central body having a first enclosure housing (i) a flight controller configured to direct movement of the unmanned aerial vehicle, (ii) a navigation system configured to generate three-dimensional position information of the unmanned aerial vehicle in three-dimensional space, and (iii) a payload mounting interface, (b) at least one motor operatively connected to the central body with at least one respective propeller, each motor being operatively connected to the flight controller, (c) a condensation particle detection payload mounted to the central body via the payload mounting interface, the condensation particle detection payload being configured to generate first particle count information and first particle size information each including information regarding particles of sizes less than 10 microns, and (d) a data acquisition board operatively connected to the condensation particle detection payload configured to obtain the first particle count information and to determine first extinction information at one or more locations in three-dimensional space based on the first particle count information, by the steps of: (i) obtaining the first particle count information from the condensation particle detection payload, and (ii) determining first extinction information based on the first particle count information.

In exemplary embodiments, the first extinction information is determined by the formula:

$$\beta_{e,s,a}(\lambda) = \int_{r_1}^{r_2} Q_{e,s,a}(n, \lambda, r)\pi r^2 \frac{dN(r)}{r \ln 10 d(\log r)} \approx$$

$$\sum_{i=r_{min}}^{r_{max}} Q_{e,s,a}(n, \lambda, r_i)\pi r_i^2 \frac{dN_i}{r_i \ln 10 d(\log r_i)} \Delta r_i$$

where $\beta_{e,s,a}(\lambda)$ are first wavelength-specific normalized extinction, scattering, and absorption coefficients, $Q_{e,s,a}(n, \lambda, r_i)$ are aerosol-constituent specific extinction, scattering, and absorption efficiency, and r is a modal radius associated with the first particle size information.

In exemplary embodiments, the data acquisition board is further configured to determine first transmission information over a first distance based on the first extinction information. In exemplary embodiments, determining first transmission information involves the steps of: (i) generating first optical depth information by the formula:

$$\tau(z_1, z_2) = \int_{z_1}^{z_2} \beta(z) dz.$$

where $\tau$ is first optical depth information, $\beta(z)$ is a layer volume extinction coefficient, and z is a geometric height, and (ii) generating the first transmission information by the formula:

$$t(\tau) = e^{-\tau/|\cos\theta|},$$

where t is the first transmission information, $\tau$ is the first optical depth information, and $\theta$ is a source angle of incidence upon a parallel plane.

In exemplary embodiments, step (d) further involves determining the first extinction information based on the first particle count information and first particle size information. In exemplary embodiments, the first particle size information is generated by the steps of: (1) generating, by a first humidity sensor mounted on the unmanned aerial vehicle and operatively connected to the data acquisition board, first relative humidity information associated with a first relative humidity, (2) obtaining the first relative humidity information by the data acquisition board from the first humidity sensor, and (3) determining the first particle size information based on the first relative humidity information. In exemplary embodiments, the first particle size information is determined by the formula:

$$\log r(a_w) = \pm\left[-\ln\left(ND\sqrt{2\pi}\log\sigma\right)^2\right]^{1/2} + \log r_M,$$

where $r(a_w)$ is a first humidity-altered radius value, ND is a normalized radius-specific particle number density per unit volume value, σ is a first standard deviation, and $r_M$ is a modal radius value for the given first relative humidity information.

In exemplary embodiments, the data acquisition board is housed in the first enclosure.

In exemplary embodiments, the data acquisition board is housed in a second enclosure mounted to the central body.

In exemplary embodiments, the at least one motor includes four motors, each of the four motors being operatively connected to the flight controller and having at least one respective propeller.

In exemplary embodiments, the condensation particle detection payload is configured to generate the first particle count information by the steps of (1) ingesting, by an inlet of the condensation particle detection payload, a first air sample at a first volumetric flow rate, the first air sample having a plurality of atmospheric aerosol particles and a plurality of water vapor particles, and the inlet being operatively connected to a wick of the condensation particle detection payload, (2) cooling, by a conditioner of the condensation particle detection payload enclosing the wick, the first air sample, (3) condensing, by the conditioner, the plurality of water vapor particles to form a plurality of liquid water particles, (4) heating, by an initiator of the condensation particle detection payload enclosing the wick, the first air sample and the plurality of liquid water particles to supersaturate the first air sample and heat the plurality of atmospheric aerosol particles, (5) enlarging, by a growth component of the condensation particle detection payload, the heated plurality of atmospheric aerosol particles, (6) recycling the plurality of liquid water particles to the wick, and (7) determining, by a detector of the condensation particle detection payload, the first particle count information associated with the first air sample based on the enlarged plurality of atmospheric aerosol particles. In exemplary embodiments, the first particle count information is measured between 5 nanometers and 2.5 microns.

In exemplary embodiments, there is a method for measuring extinction using an unmanned aerial vehicle involving: (a) generating, by a condensation particle detection payload operatively connected to a data acquisition board, both of which are mounted on the unmanned aerial vehicle, first particle count information associated with a first volumetric particle density at the condensation particle detection payload, (b) generating, by a first humidity sensor mounted on the unmanned aerial vehicle and operatively connected to the data acquisition board, first relative humidity information associated with a first relative humidity, (c) transmitting, from the condensation particle detection payload to the data acquisition board, the first particle count information, (d) transmitting, from the first humidity sensor to the data acquisition board, the first relative humidity information, (e) storing, in memory operatively connected to the data acquisition board, the first particle count information and the first relative humidity information, (f) determining, by the data acquisition board, first particle size information based on the first relative humidity information, (g) generating, by the data acquisition board, first extinction information based on the first particle count information and the first particle size information; and (h) transmitting, by the data acquisition board to an optical system, the first extinction information. In exemplary embodiments, the generating step (a) further involves: (i) ingesting, by an inlet of the condensation particle detection payload, a first air sample at a first volumetric flow rate, the first air sample having a plurality of atmospheric aerosol particles and a plurality of water vapor particles, and the inlet being operatively connected to a wick of the condensation particle detection payload, (ii) cooling, by a conditioner of the condensation particle detection payload enclosing the wick, the first air sample, (iii) condensing, by the conditioner, the plurality of water vapor particles to form a plurality of liquid water particles, (iv) heating, by an initiator of the condensation particle detection payload enclosing the wick, the first air sample and the plurality of liquid water particles to supersaturate the first air sample, (v) enlarging, by a growth component of the condensation particle detection payload, the heated plurality of atmospheric aerosol particles, (vi) recycling the plurality of liquid water particles to the wick, and (vii) determining, by a detector of the condensation particle detection payload, the first particle count information associated with the first air sample based on the enlarged plurality of atmospheric aerosol particles. In exemplary embodiments, the first particle count information is measured between 5 nanometers and 2.5 microns.

In exemplary embodiments, the first particle size information is determined by the formula:

$$\log r(a_w) = \pm\left[-\ln\left(ND\sqrt{2\pi}\log\sigma\right)^2\right]^{1/2} + \log r_M,$$

where $r(a_w)$ is a first humidity-altered radius value, ND is a normalized radius-specific particle number density per unit volume value, $\sigma$ is a first standard deviation, and $r_M$ is a modal radius value for the given first relative humidity information.

In exemplary embodiments, the first extinction information is determined by the formula:

$$\beta_{e,s,a}(\lambda) = \int_{r_1}^{r_2} Q_{e,s,a}(n, \lambda, r)\pi r^2 \frac{dN(r)}{r\ln 10 d(\log r)} \approx$$
$$\sum_{i=r_{min}}^{r_{max}} Q_{e,s,a}(n, \lambda, r_i)\pi r_i^2 \frac{dN_i}{r_i\ln 10 d(\log r_i)}\Delta r_i$$

where $\beta_{e,s,a}(\lambda)$ are first wavelength-specific normalized extinction, scattering, and absorption coefficients, $Q_{e,s,a}(n, \lambda, r_i)$ are aerosol-constituent specific extinction, scattering, and absorption efficiency, and r is a modal radius associated with the first particle size information.

In exemplary embodiments, the method further involves determining, by the optical system, first transmission information over a first distance based on the first extinction information, by the steps of: (i) generating first optical depth information based on the first extinction information by the formula:

$$\tau(z_1, z_2) = \int_{z_1}^{z_2} \beta(z) dz.$$

where $\tau$ is the first optical depth information, $\beta(z)$ is a layer volume extinction coefficient, and z is a geometric height, and (ii) generating the first transmission information based on the first optical depth information by the formula:

$$t(\tau) = e^{-\tau/|\cos\theta|},$$

where t is the first transmission information, $\tau$ is the first optical depth information, and $\theta$ is a first source angle of incidence upon a parallel plane.

BRIEF DESCRIPTION OF THE DRAWINGS

The above and related objects, features and advantages of the present disclosure will be more fully understood by reference to the following detailed description of the preferred, albeit illustrative, embodiments of the present invention when taken in conjunction with the accompanying figures, wherein:

FIG. 6B is a table depicting further exemplary sensor output information and sensor calculations in accordance with embodiments of the present invention;

FIG. 6C is a table depicting exemplary particle detection payload output information in accordance with embodiments of the present invention;

FIGS. 8A, 8B, 8C, and 8D are exemplary process flows for calculating extinction using an unmanned aerial vehicle and mounted payloads in accordance with embodiments of the present invention.

DETAILED DESCRIPTION OF THE EXEMPLARY EMBODIMENTS

The present invention generally relates to methods and apparatuses for measuring extinction using an unmanned aerial vehicle. In embodiments, the apparatus for measuring extinction using an unmanned aerial vehicle may be used in conjunction with a remote control system.

A significant technical challenge faced in a real-world environment is obtaining in real time and real space extinction information to determine accurately how effectively light is transmitted. Technical challenges associated with obtaining and calculating in three-dimensional space the necessary data to calculate extinction precluded prior systems from providing accurate information as discussed below.

Figure 1:
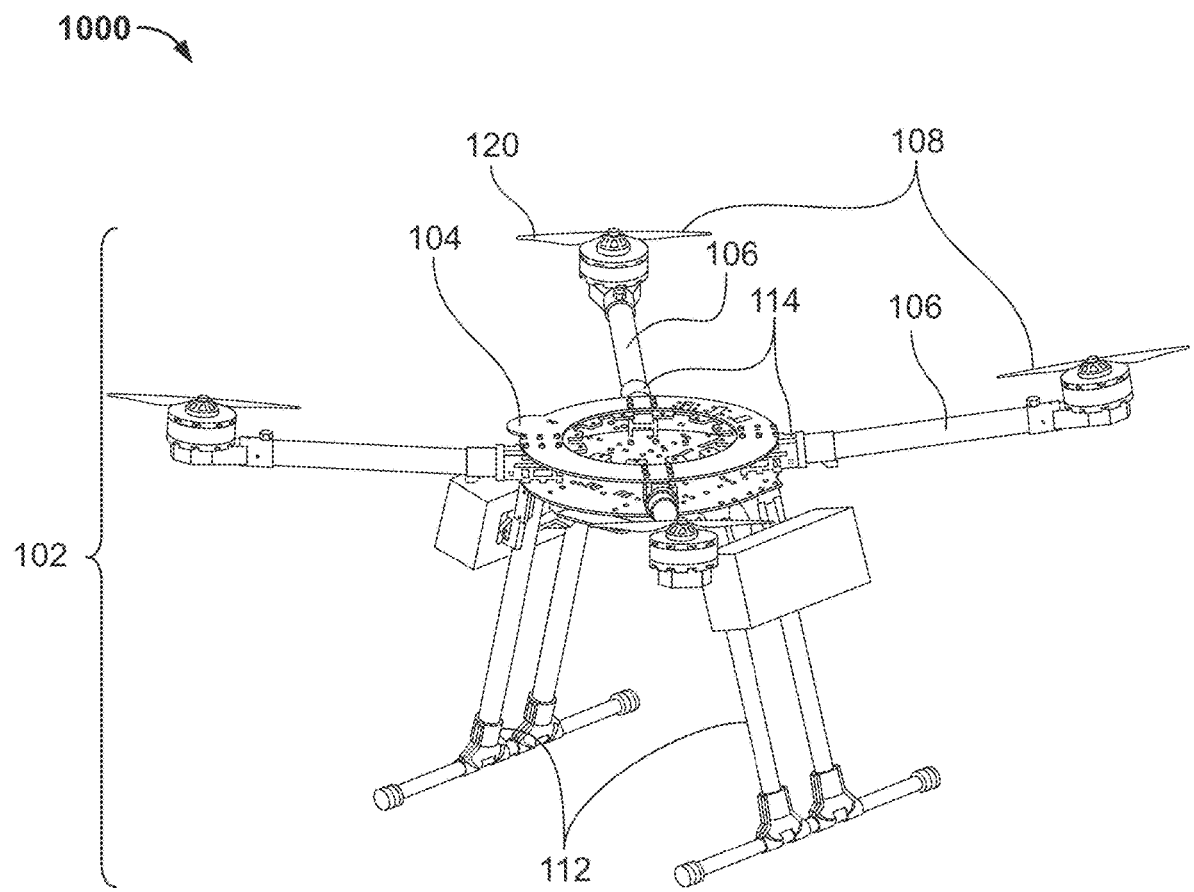
FIG. 1 is an illustration of a representative unmanned aerial vehicle that can be used in accordance with embodiments of the present invention.

FIG. 1 is a schematic illustration of a representative unmanned aerial vehicle 102 that can be used in accordance with embodiments of the invention. An unmanned aerial vehicle 102, that may be used in conjunction with exemplary embodiments of the present invention, may include a central body 104, at least one motor 108, a mounting element 122, a plurality of mounting rods 106, a plurality of mounting rod interfaces 114, a plurality of support rods 112. The unmanned aerial vehicle 102 shown in FIG. 1 (Blue Halo E1250) includes a central body 104, four respective motors 108, mounting rods 106, and mounting elements 122, mounting rod interfaces 114 and support rods 112. Other configurations of unmanned aerial vehicles can be used in conjunction with the present invention.

Figure 2A:
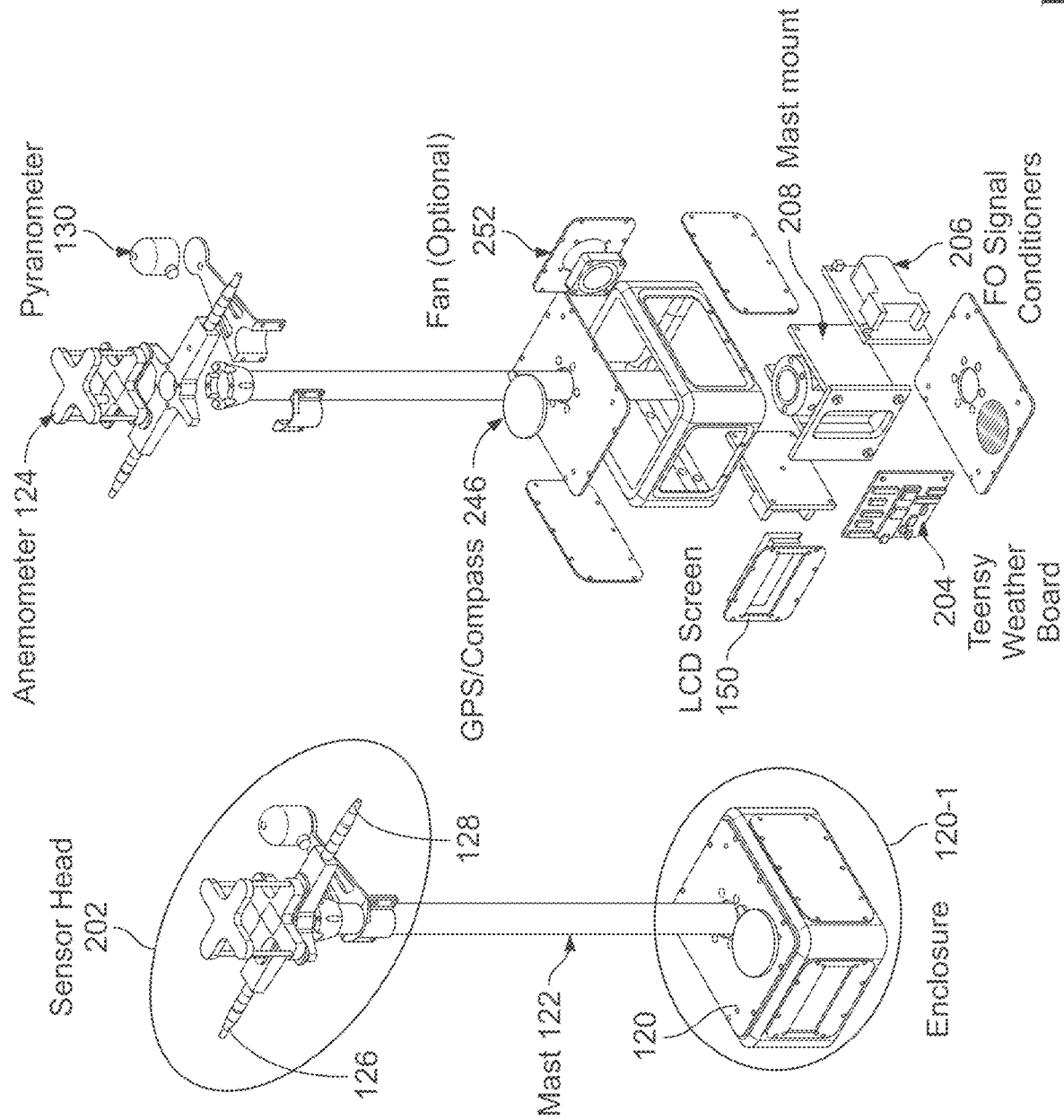
FIG. 2A is an illustration of a representative weather sensor payload in assembled and exploded forms that can be used in conjunction with an unmanned aerial vehicle in accordance with embodiments of the present invention.

FIG. 2A is an illustration of a representative weather sensor payload 300 in assembled and exploded forms that can be used in conjunction with an unmanned aerial vehicle in accordance with embodiments of the present invention. A representative weather sensor payload 300 may include a base 120; a mast 122; and one or more sensor heads 202. In embodiments, sensor head(s) 202 may include a first differential temperature sensor 126, a second differential temperature sensor 128, an anemometer 124, and a pyranometer 130, to name a few. The base 120 may include an enclosure 120-1, which may include a navigation system (e.g., GPS) 246, a mast mount 208, a plurality of signal conditioners 206, a weather board 204, and an LCD screen 150.

Figure 2B:
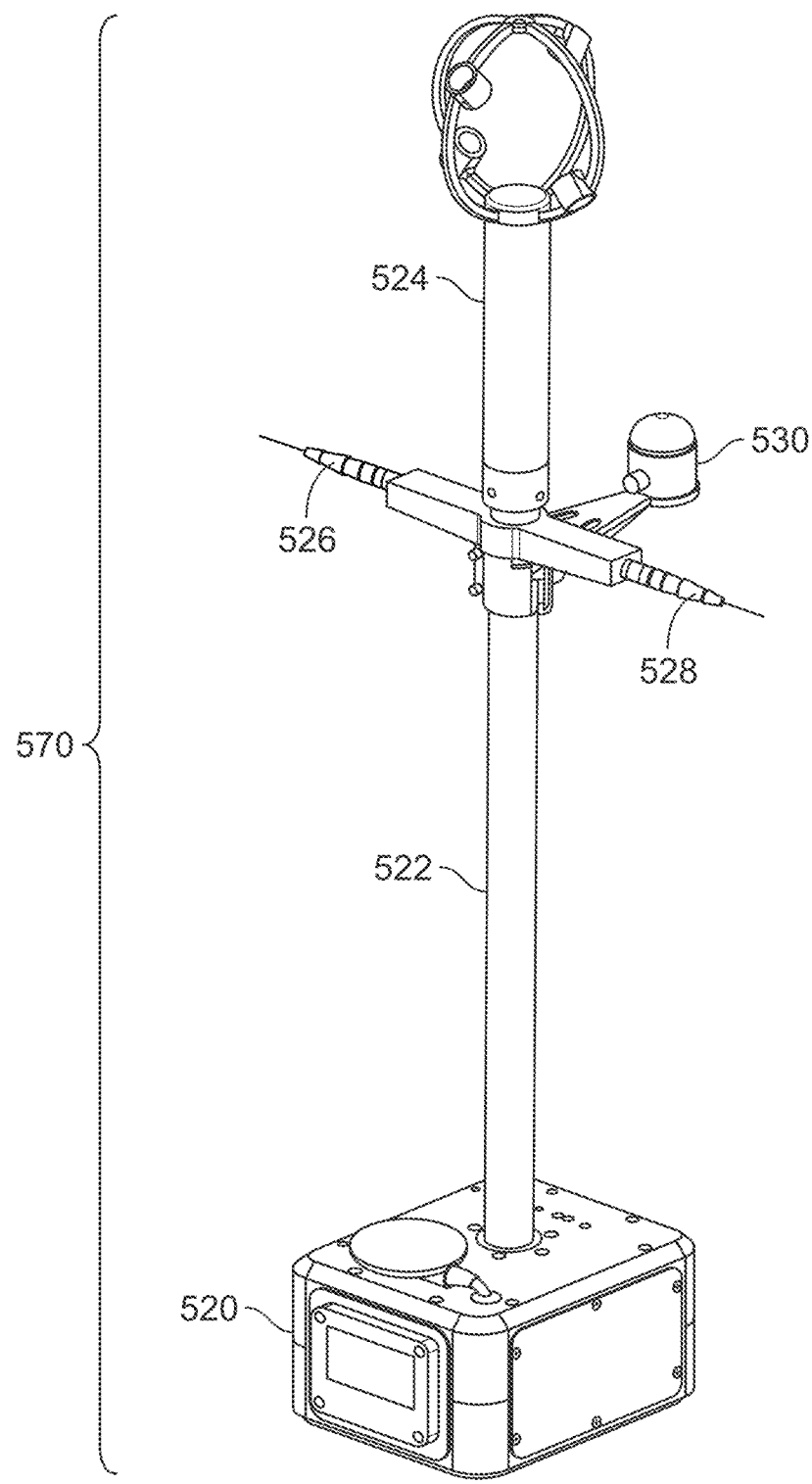
FIG. 2B is an illustration of another representative weather sensor payload that can be used in conjunction with an unmanned aerial vehicle in accordance with embodiments of the present invention.

FIG. 2B is an illustration of another representative weather sensor payload that can be used in conjunction with an unmanned aerial vehicle in accordance with embodiments of the present invention. In embodiments, the weather sensor may include a base 520, a mounting element 522, a first differential temperature sensor 526, a second differential temperature sensor 528, and an anemometer 524. In embodiments, the weather sensor may further include a pyranometer 530 mounted to the mounting element 522.

Figure 2C:
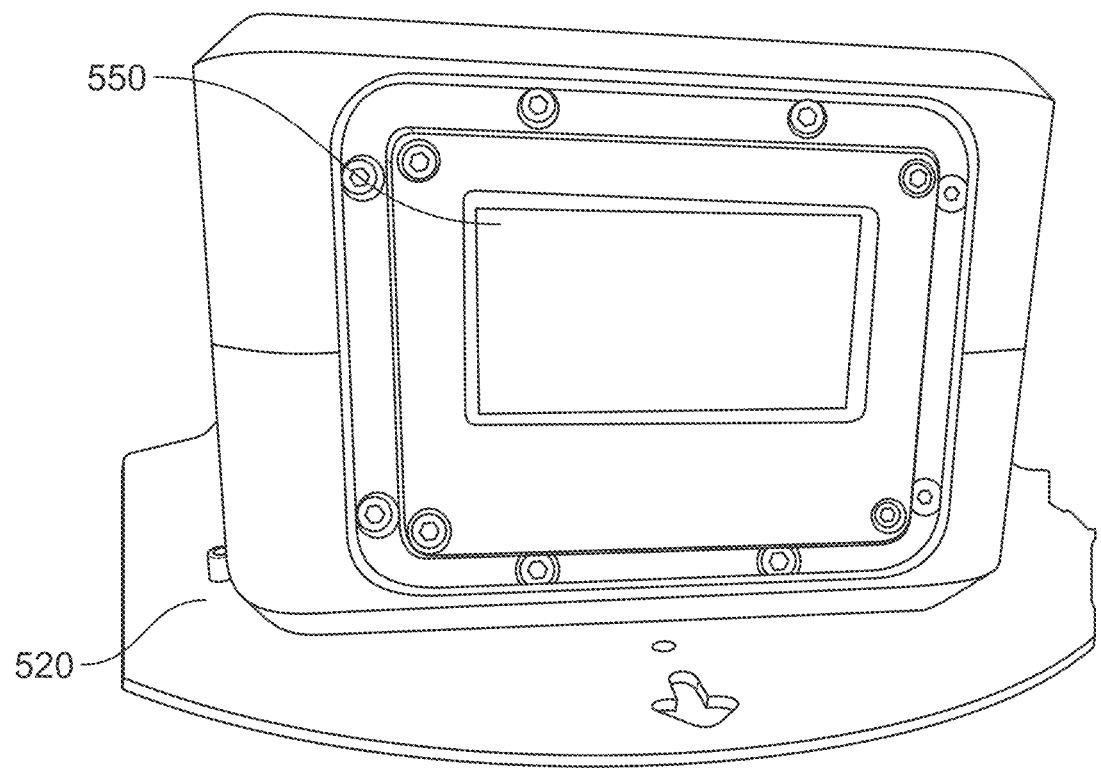
FIG. 2C is an illustration of a representative base with a representative display of a weather sensor payload that can be used in conjunction with an unmanned aerial vehicle in accordance with embodiments of the present invention.

FIG. 2C is an illustration of base including a representative display screen 550 of a weather sensor payload that suitable for use with an unmanned aerial vehicle in accordance with embodiments of the present invention. In embodiments, the display screen 550 may be operatively connected to a processor 560. In embodiments, the display screen 550 may be operatively connected to memory 542. In embodiments, the display screen 550 may be configured to display, in real time, at least one or more of: first differential temperature measurement information; second differential temperature measurement information; third temperature measurement information; first wind speed measurement information; first wind direction information; humidity measurement information; the altitude measurement information; geolocational information; and/or the solar irradiance measurement information. In embodiments, the display screen 550 may be an LCD display screen. In embodiments, the display screen 550 may display one or more of: first differential temperature measurement information; second differential temperature measurement information; third temperature measurement information; first wind speed measurement information; first wind direction information; humidity measurement information; the altitude measurement information; geolocational information; and/or the solar irradiance measurement information not in real time.

Figure 3:
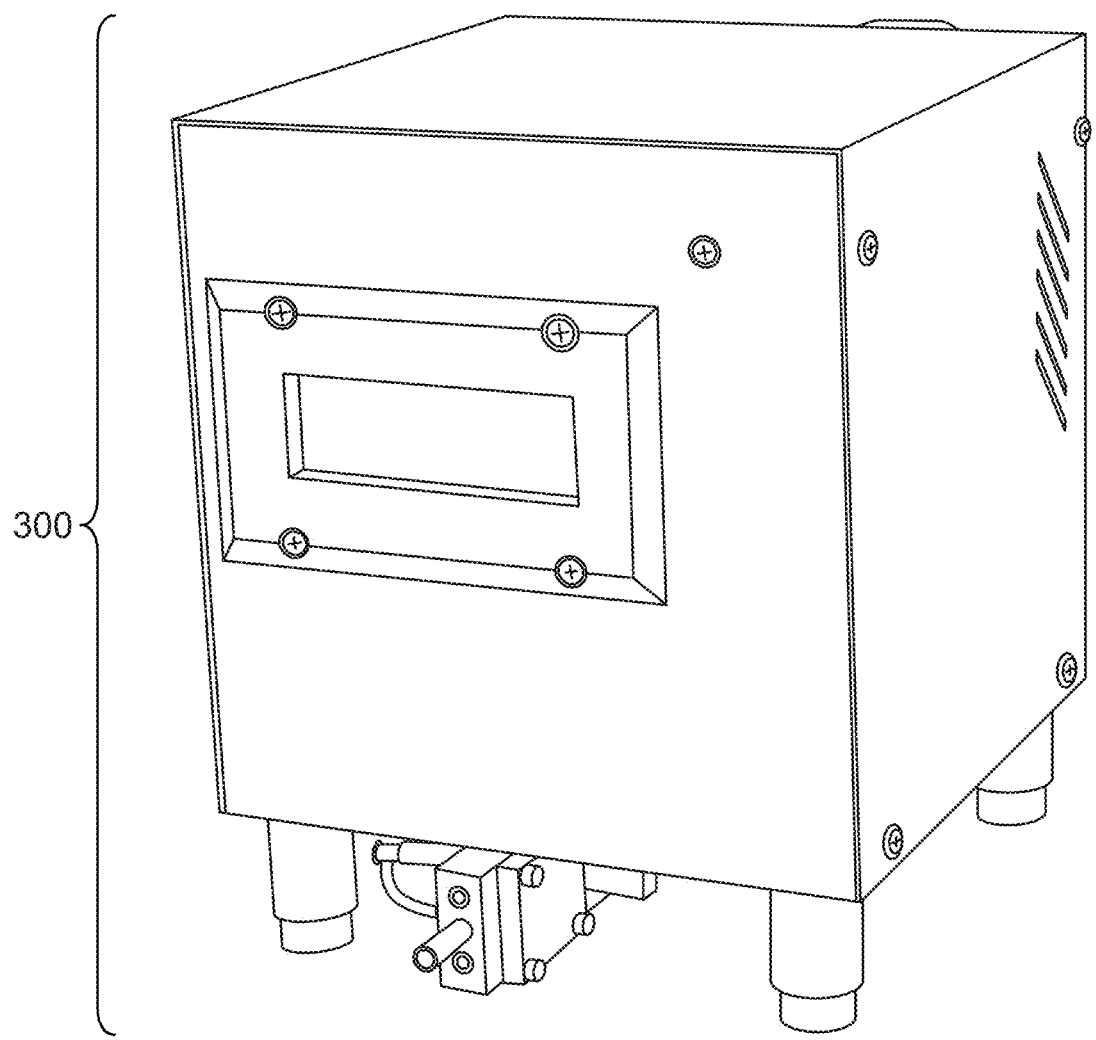
FIG. 3 is an illustration of a representative condensation particle detection payload that can be used in conjunction with an unmanned aerial vehicle in accordance with embodiments of the present invention.

FIG. 3 is an illustration of a representative condensation particle detection payload 300 that can be used in conjunction with an unmanned aerial vehicle in accordance with embodiments of the present invention.

Figure 3A:
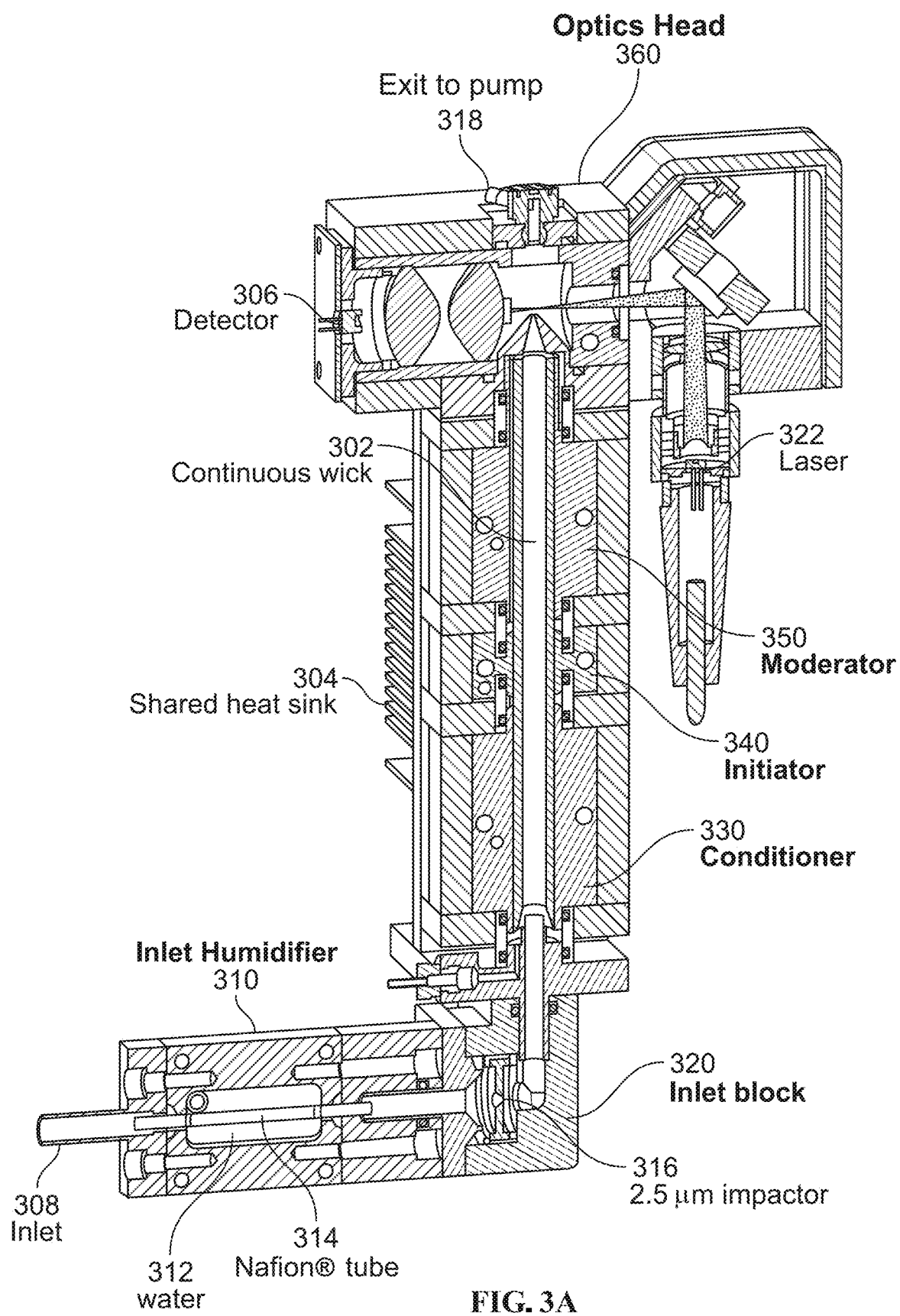
FIG. 3A is a schematic illustration of components of a representative condensation particle detection payload shown in FIG. 3 that can be used in accordance with embodiments of the present invention.

FIG. 3A is a schematic illustration of components of a representative condensation particle detection payload 300 shown in FIG. 3 that suitable for use in embodiments of the present invention The particle detection payload 300 (e.g., condensation particle counter) may include a continuous wick 302, an inlet 308, a detector 306, a conditioner 330, a growth component (such as moderator 350), an initiator 340. The condensation particle counter may further include a shared heat sink 304, an inlet humidifier 310, a water supply 312, a Nafion® tube 314, a 2.5 µm impactor 316, an exit 318, an inlet block 320, a laser 322, and an optics head 360. In embodiments, the condensation particle detection payload 300 may be a MAGIC™ Water Condensation Particle Counter.

Figure 4:
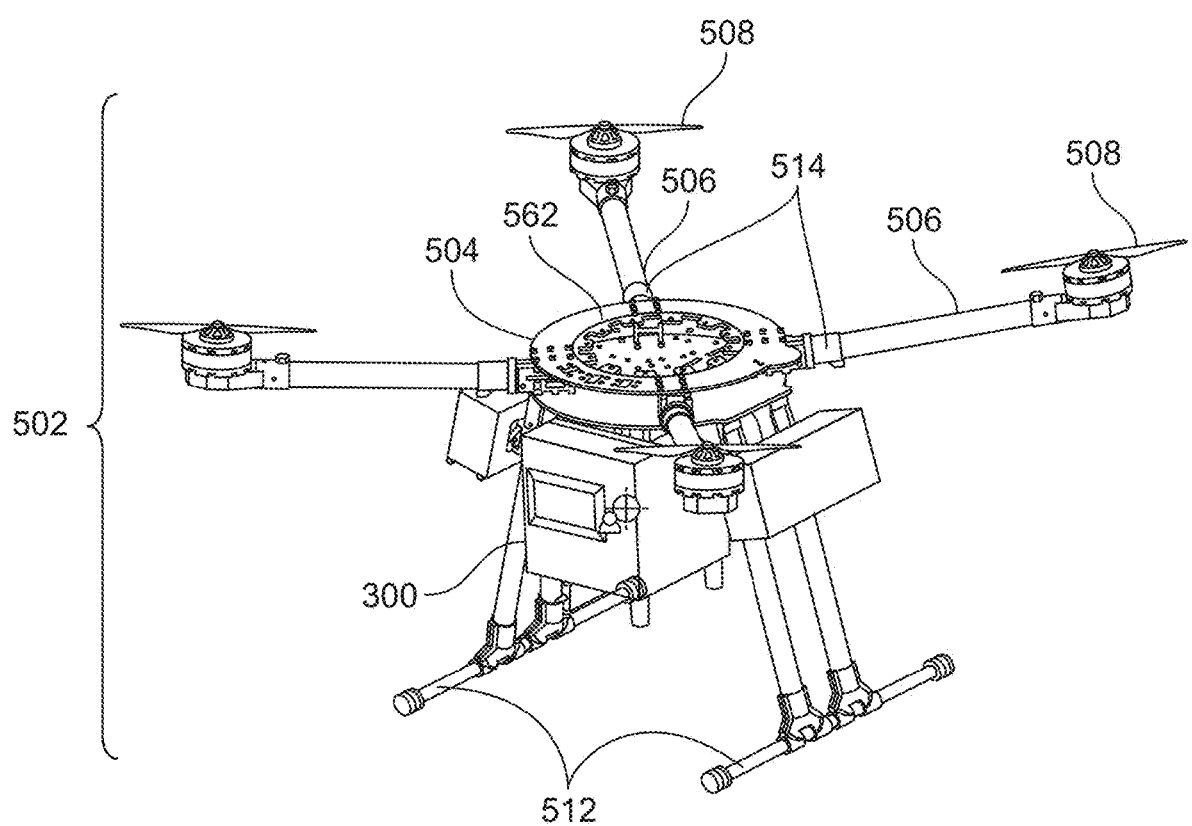
FIG. 4 is an illustration of an unmanned aerial vehicle including a condensation particle detection payload in accordance with embodiments of the present invention.

FIG. 4 is an illustration of an unmanned aerial vehicle 502 including a condensation particle detection payload 300 in accordance with embodiments of the present invention. In embodiments, the unmanned aerial vehicle 502 may be a drone. In embodiments, the unmanned aerial vehicle 502 may include a central body 504, and at least one motor 508. In embodiments, the central body 504 may further include a plurality of mounting rod interfaces 514. In embodiments, the central body 504 may further include a plurality of support rod interfaces. In embodiments, the central body 504 may include a plurality of motor mounting rods 506 wherein each motor mounting rod of the plurality of motor mounting rods 506 is operatively connected to the central body 504 via a respective mounting rod interface of the plurality of mounting rod interfaces 514.

Figure 4A:
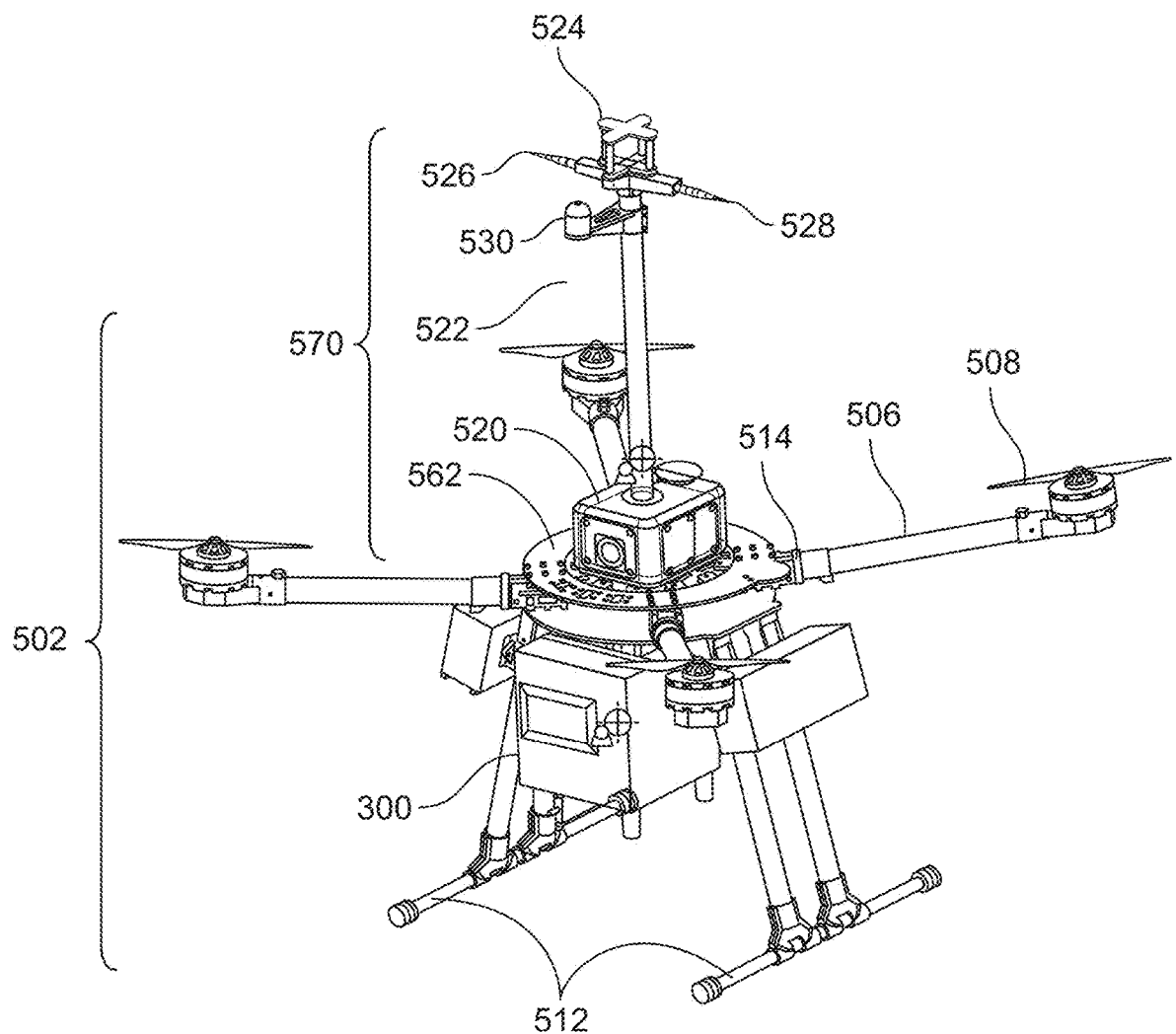
FIG. 4A is an illustration of an unmanned aerial vehicle including a condensation particle detection payload and a weather sensor payload in accordance with embodiments of the present invention.

FIG. 4A is an illustration of an unmanned aerial vehicle 502 including a condensation particle detection payload 300 and a weather sensor payload 570 in accordance with embodiments of the present invention, which includes the same components depicted in FIG. 4. In embodiments, the unmanned aerial vehicle 502 may also include the mounting element 522, the first differential temperature sensor 526, the second differential temperature sensor 528, and an anemometer 524. In embodiments, the unmanned aerial vehicle 502 may further include a pyranometer 530 mounted on the mounting element 522.

Figure 5A:
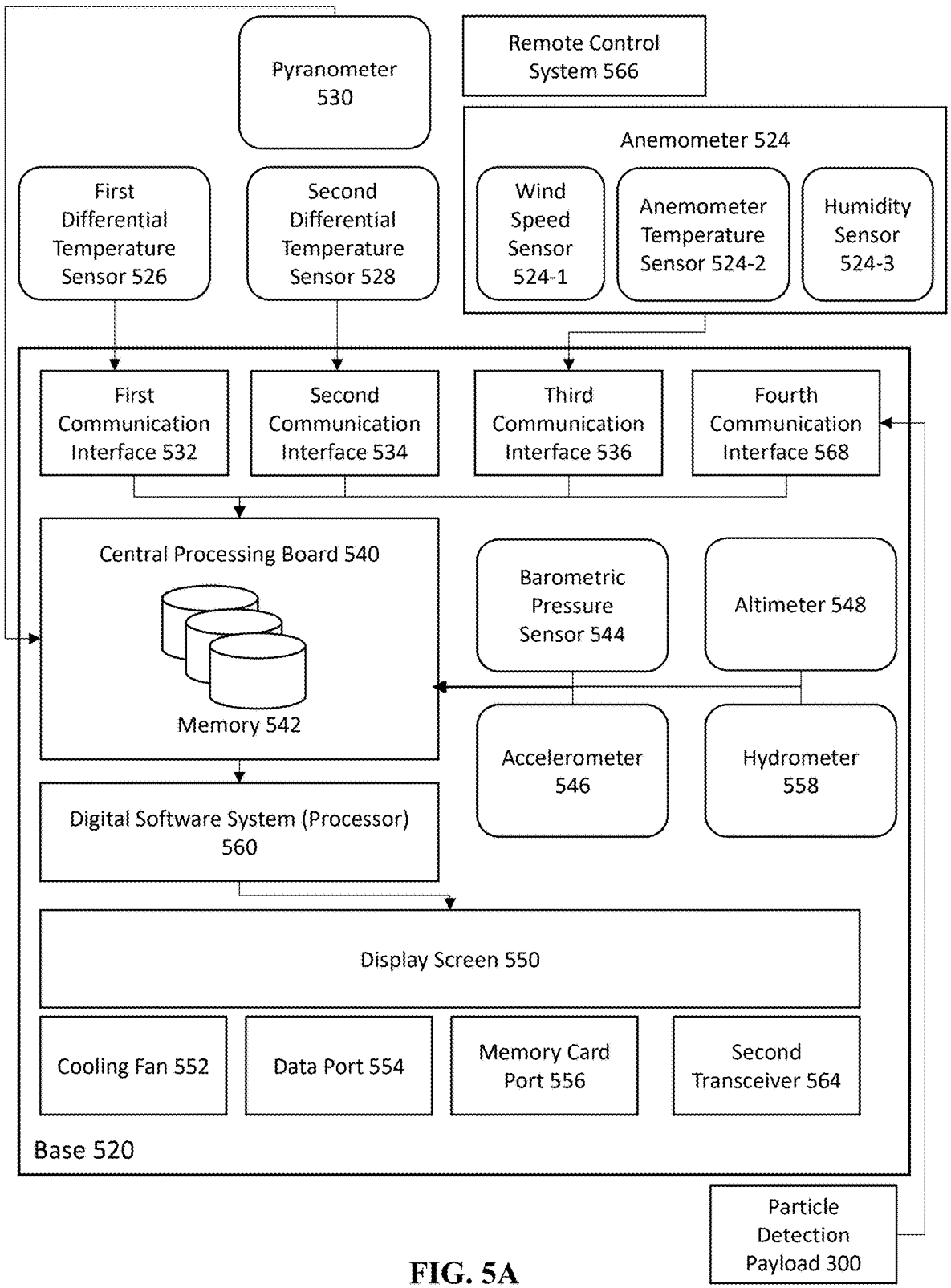
FIG. 5A is a schematic illustration of components in a base of a payload to be used in conjunction with an unmanned aerial vehicle in accordance with embodiments of the present invention.
Figure 5B:
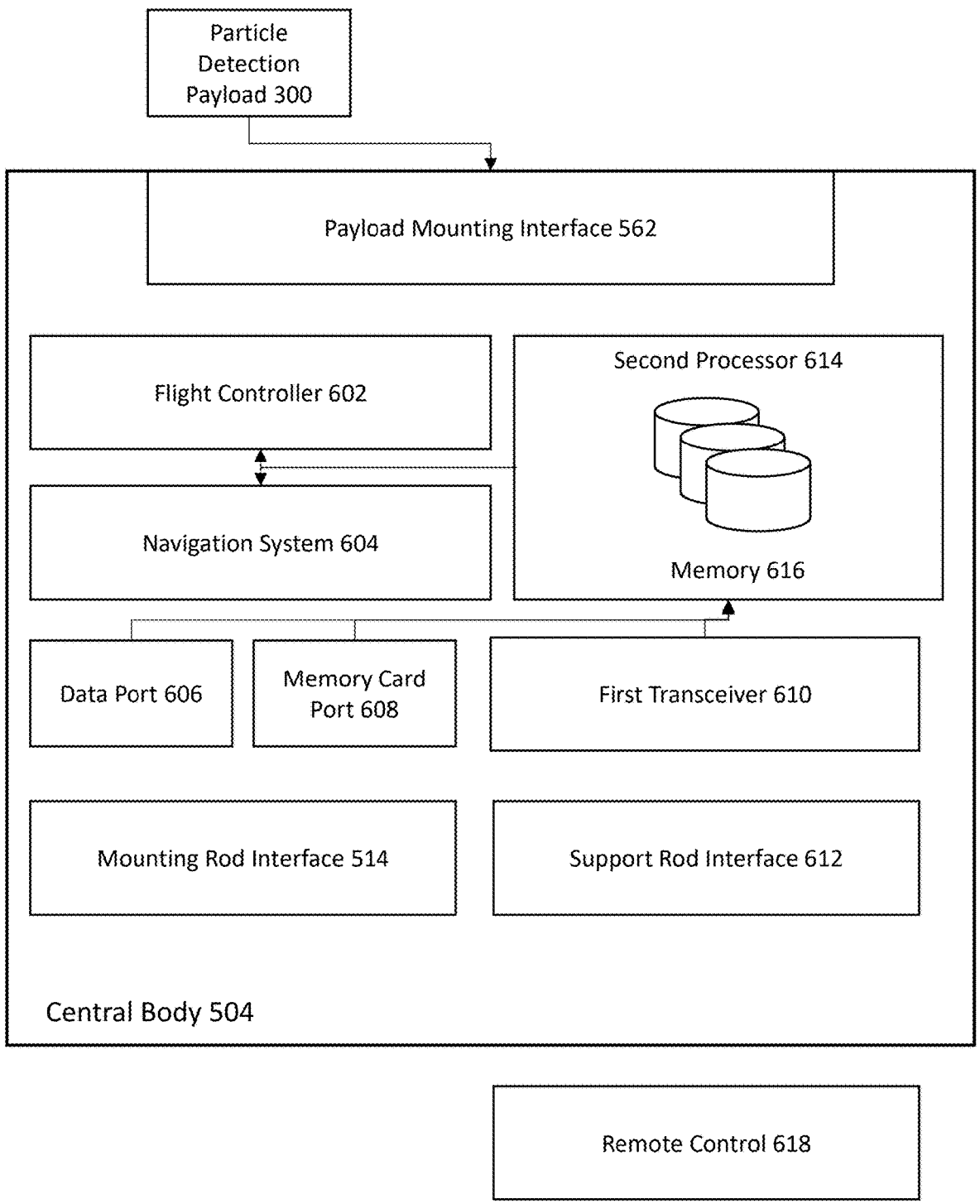
FIG. 5B is a schematic illustration of components in a central body of an unmanned aerial vehicle in accordance with embodiments of the present invention.

FIG. 5B is a schematic illustration of the central body 504 of an apparatus for measuring optical turbulence in conjunction with an unmanned aerial vehicle 502 in accordance with embodiments of the present invention. In embodiments, the unmanned aerial vehicle 502 may further include a first transceiver 610. In embodiments, the unmanned aerial vehicle 502 may be operated by a remote control 618 via the first transceiver 610. In embodiments, the central body 504 may include a first enclosure housing a flight controller 602, a navigation system 604, and a payload mounting interface 562. In embodiments, the central body 504 may be completely enclosed. In embodiments, the central body 504 may be open on one or more sides. In embodiments, the flight controller 602 may be configured to direct the movement of the unmanned aerial vehicle 502. In embodiments, the unmanned aerial vehicle 502 may be preprogrammed with memory operatively connected to the flight controller 602. In embodiments, the unmanned aerial vehicle 502 may be preprogrammed via a wired connection (e.g., data port 606). In embodiments, the unmanned aerial vehicle 502 may be preprogrammed via removeable memory (via e.g., memory card port 608). For example, in embodiments, the removeable memory 608 may be an SD Card, such as a Secure Digital Card, Secure Digital High Capacity Card, a Secure Digital Extended Capacity Card, or a Micro Secure Digital Card to name a few. In embodiments, the unmanned aerial vehicle 502 may be configured to receive instructions via the first transceiver 610. In embodiments, the navigation system 604 may be configured to generate three-dimensional position information associated with the unmanned aerial vehicle 502 in three-dimensional space. For example, in embodiments the navigation system 604 may be a GPS system. In embodiments, the condensation particle detection payload 300 may be an example of a payload mounted to the central body 504 via the payload mounting interface 562. In embodiments, the payload mounting interface 562 may be located on the top or the bottom of the central body 504. In embodiments, the condensation particle detection payload 300 may be mounted to the top or the bottom of the central body 504 via the payload mounting interface 562.

Referring again to FIGS. 4 and 4A, in embodiments, the unmanned aerial vehicle 502 may include at least one motor 508 operatively connected to the central body 504 with at least one respective propeller 509, wherein the at least one motor 508 is operatively connected to the flight controller 602. In embodiments, each propeller 509 has two or more blades. In embodiments, the at least one motor 508 is mounted on a respective motor mounting rod of the plurality of motor mounting rods 506. In embodiments, the at least one motor 508 may be a three-phase motor. In embodiments, the unmanned aerial vehicle 502 may have any number of motors 508 and corresponding propellers 509. For example, in embodiments, the unmanned arial vehicle 502 may include 2 motors 508, along with 2 corresponding propellers 509. In embodiments, the unmanned arial vehicle 502 may include 4 motors 508, along with 4 corresponding propellers 509. In embodiments, the unmanned arial vehicle 502 may include 6 motors 508, along with 6 corresponding propellers 509. In embodiments, the unmanned arial vehicle 502 may include 8 motors 508, along with 8 corresponding propellers 509.

In embodiments, the unmanned aerial vehicle 502 may include a mounting element 522. In embodiments, the mounting element 522 may be, for example, a rod, shaft, mast, or bracket to name a few. In embodiments the mounting element 522 may be a support rod. In embodiments, the mounting element 522 may be mounted to the base 520.

In embodiments, the anemometer 524 as shown in FIG. 2B may be mounted on the mounting element 522 and may be configured to generate first wind speed measurement information associated with a first wind speed at the anemometer 524. In embodiments, the anemometer 524 may be further configured to generate first temperature measurement information associated with a first temperature at the anemometer 524. In embodiments, the anemometer 524 may be configured to generate first relative humidity information associated with a first relative humidity at the anemometer 524. In embodiments, the anemometer 524 may be configured to generate the first wind speed measurement information at a first sampling rate. In embodiments, the anemometer 524 may be configured to generate the first temperature measurement information at the first sampling rate. In embodiments, the anemometer 524 may be a sonic anemometer. In embodiments, the anemometer 524 may be a standing wave anemometer. In embodiments, the anemometer 524 may be configured to generate first wind direction information associated with a first wind direction at the anemometer 524. In embodiments, the anemometer 524 may include an anemometer temperature sensor 524-2. In embodiments, the anemometer temperature sensor 524-2 may be operable to generate temperature measurement information. In embodiments, the anemometer 524 may include an accelerometer configured to generate pitch, yaw and roll axis rotation measurement information. In embodiments, the anemometer 524 may include a humidity sensor 524-3 configured to generate relative humidity measurement information (as a percentage). In embodiments, the humidity sensor 524-3 may be a standalone sensor operatively connected to the central processing board 540 via an additional communication interface such as fourth communication interface 568. In embodiments, such a standalone sensor may be operably connected to the central processing board via any suitable interface or connector.

In embodiments, the first differential temperature sensor 526 may be mounted on the mounting element 522 and may be configured to generate second temperature measurement information associated with a second temperature at the first differential temperature sensor 526. In embodiments, the first differential temperature sensor may be configured to generate the second temperature measurement information at the first sampling rate.

In embodiments, the second differential temperature sensor 528 may be mounted to the mounting element 522 and may be configured to generate third temperature measurement information associated with a third temperature at the second differential temperature sensor 528. In embodiments, the second differential temperature sensor 528 may be configured to generate the third temperature measurement information at the first sampling rate. In embodiments, the unmanned aerial vehicle 502 may further include a pyranometer 530 mounted on the mounting element 522 and may be configured to generate solar irradiance measurement information associated with a solar irradiance at the pyranometer 530. In embodiments, the pyranometer 530 may be configured to generate the solar irradiance information at the first sampling rate.

Figure 5C:
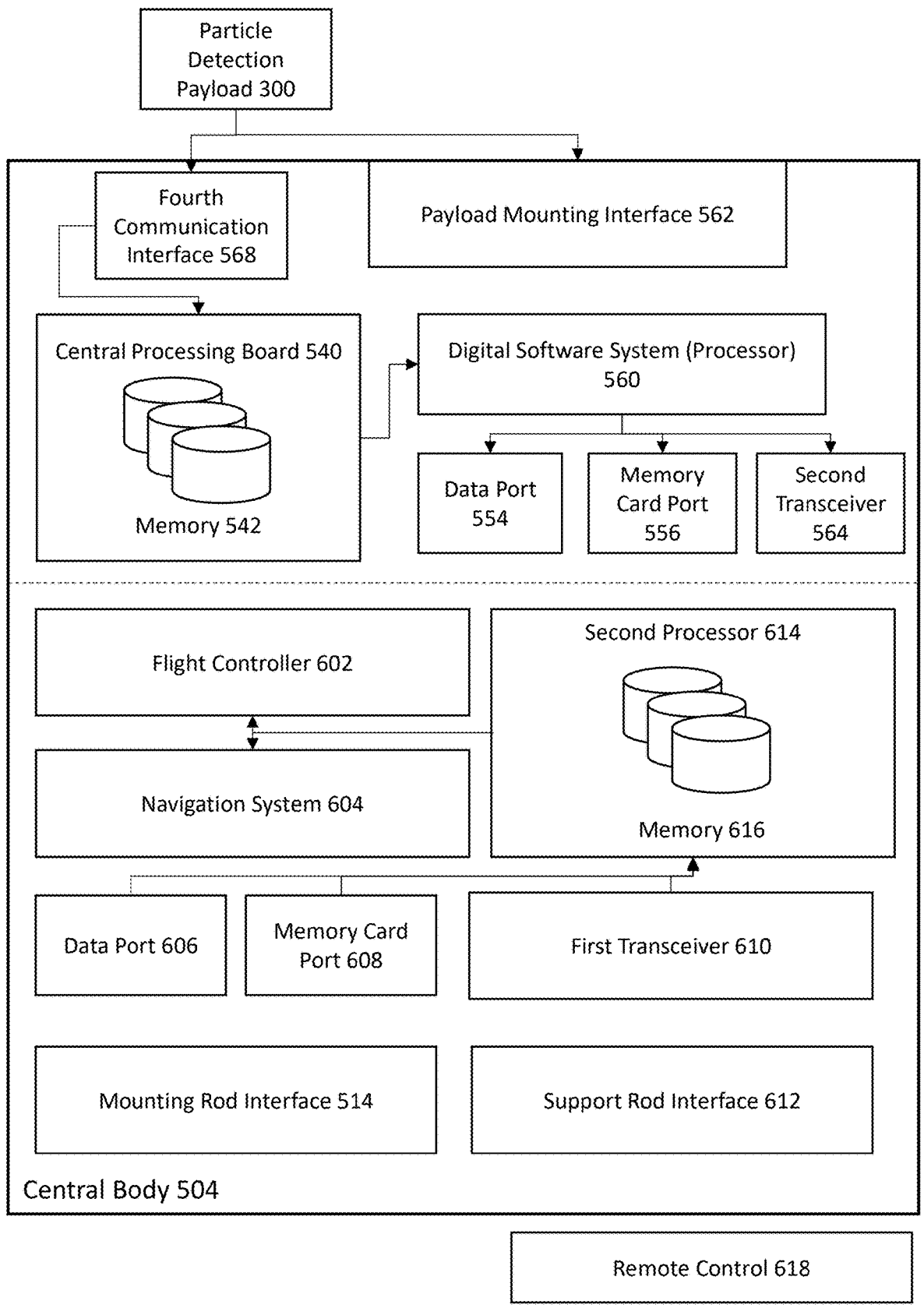
FIG. 5C is another schematic illustration of components in a central body of an unmanned aerial vehicle in accordance with embodiments of the present invention.

In embodiments, the base 520 may be mounted on the central body 504 via the payload mounting interface 562. FIG. 5A is a schematic illustration of components in a base 520 of a payload to be used in conjunction with an unmanned aerial vehicle 502 in accordance with embodiments of the present invention. In embodiments, referring to FIG. 5A, the base 520 may include a second enclosure housing a first barometric pressure sensor 544, a central processing board 540, memory 542 operatively connected to the central processing board 540, and a processor 560 operatively connected to the memory 542. In embodiments, the central processing board 540 may be a data acquisition board. In embodiments, the second enclosure may include one or more openings to allow for external connections. In embodiments, the base 520 may further include one or more of an accelerometer 546, an altimeter 548, a hydrometer 558, a cooling fan 552, a data port 554, a removeable memory card port 556, and/or a display screen 550. In embodiments, one or more of the components illustrated in FIG. 5A, may be located in other portions of the unmanned aerial vehicle and/or its payloads, as long as such components are operatively connected to each other. For example, FIG. 5C is another illustration of components in a central body 504 of an unmanned aerial vehicle 502 in accordance with embodiments of the present invention. By way of illustration, in exemplary embodiments, each of the components located in base 520, maybe located in central body 504 without deviating from embodiments of the present invention. Similarly, in other embodiments, by illustration only some of the components located in the base 520 may be located in central body 504 without deviating from embodiments of the present invention. In FIG. 5C, in embodiments, the condensation particle detection payload 300 may be operatively connected to the central processing board 540, which may be located within central body of the unmanned aerial vehicle 502. In embodiments, the digital software system 560 (e.g., processor), data port 554, memory card port 556, and/or second transceiver 564 may be located within the central body 504.

In embodiments, the first barometric pressure sensor 544 may be configured to generate first barometric pressure measurement information associated with a first barometric pressure at the first barometric pressure sensor 544. In embodiments, the first barometric pressure sensor 544 may be configured to generate the first barometric pressure information at the first sampling rate. In embodiments, the accelerometer 546 may be configured to generate three-dimensional position measurement information associated with a three-dimensional position at the accelerometer 546. In embodiments, the accelerometer 546 may be configured to generate the three-dimensional position information at the first sampling rate. In embodiments, the altimeter 548 may be configured to generate altitude measurement information associated with an altitude at the altimeter 548. In embodiments, the altimeter 548 may be configured to generate the altitude information at the first sampling rate. In embodiments, the hydrometer 558 may be configured to generate specific gravity measurement information associated with a specific gravity at the hydrometer 558. In embodiments, the hydrometer 558 may be configured to generate the specific gravity measurement information at the first sampling rate.

In embodiments, the central processing board 540 may be configured to obtain, during a first period of time: the first temperature measurement information from the anemometer 524; the second temperature measurement information from the first differential temperature sensor 526; the third temperature measurement information from the second differential temperature sensor 528; the first wind speed information from the anemometer 524; the first barometric pressure information from the first barometric pressure sensor 544; and particle count information from the condensation particle detection payload 300. In embodiments, the central processing board 540 may be further configured to obtain the first altitude measurement information from the altimeter 548. In embodiments, the central processing board 540 may be configured to obtain the first three-dimensional position measurement information from the accelerometer 546. In embodiments, the central processing board 540 may be configured to obtain the first specific gravity measurement information from the hydrometer 558. In embodiments, the central processing board may be configured to obtain first relative humidity measurement information from the humidity sensor 524-3, which may be a component of the anemometer 524, or may be a separate component included in the second enclosure of the base 520 or elsewhere and operatively connected to the central processing board 540.

In embodiments, the first differential temperature sensor 526 may be operatively connected to the central processing board 540 via a first communication interface 532. In embodiments, the second differential temperature sensor 528 may be operatively connected to the central processing board 540 via a second communication interface 534. In embodiments, the anemometer 524 may be operatively connected to the central processing board 540 via a third communication interface 536. In embodiments, the condensation particle detection payload 300 may be operatively connect to the central processing board 540 via a fourth communication interface 568.

In embodiments, the base 520 may further include a second transceiver 564. In embodiments, the second transceiver 564 may be operatively connected to the processer 540. In embodiments, the second transceiver 564 may be operatively connected to the memory 542. In embodiments, the processor 560 may be configured to communicate with an optical system. In embodiments, the extinction information may be provided to the optical system via the second transceiver. In embodiments, the second transceiver 564 may be the same as the first transceiver 610.

In embodiments, the memory 542 may be operatively connected to the central processing board 540 and may be configured to store at least the first temperature measurement information, the second temperature measurement information, the first wind speed measurement information, the first barometric pressure measurement information, the first altitude information, and first relative humidity information with a respective associated time stamp associated with the first period of time. In embodiments, the memory 542 may be configured to store the particle count information obtained from the particle detection payload.

In embodiments, the processor 560 may be operatively connected to the memory 542 and may be configured to generate extinction information based at least on the particle count information and the relative humidity information obtained during a first period of time. FIG. 8A is a schematic diagram of a process flow for measuring extinction using an unmanned aerial vehicle 502 in accordance with embodiments of the present invention. In embodiments, a method for measuring extinction using an unmanned aerial vehicle 502 may begin at step S800. At step S800, in embodiments, the condensation particle detection payload 300 which is operatively connected to the central processing board 540 (which may be a data acquisition board), both of which are mounted on the unmanned aerial vehicle 502, may generate first particle count information associated with a first volumetric particle density at the condensation particle detection payload 300 at a first altitude. In embodiments, the condensation particle detection payload 300 may be a condensation particle counter. In embodiments, in order to generate accurate particle count information, the unmanned aerial vehicle 502, including the condensation particle detection payload 300, may fly vertically through a number of varying altitudes and/or horizontally to generate a vertical and/or horizontal profile of the particle count at that specific location. Conventional atmospheric characterization systems have been unable to measure particle count at varying altitudes, which leads to inaccurate profiling of particle count information. Conventional characterization systems have used either climatological prediction data (such as GADS and EXPERT) to approximate particle count information at a given time in a given place, or only surface level particle count measurement information taken from a particle counter fixed to the ground, or a combination of both of these methods. These conventional methods of generating atmospheric characterization profiles, however, do not and cannot generate precise particle count information in real time to provide an accurate vertical and/or horizontal profile of the particle count. Additionally, conventional particle counters have been too heavy to affix to an unmanned aerial vehicle and have not been well-equipped to handle vibration in flight. In embodiments of the present invention, the condensation particle detection payload 300 used in conjunction with the unmanned aerial vehicle 502 is lighter and solid state, such that it is able to be affixed to the unmanned aerial vehicle 502 in order to measure particle count information at varying altitudes.

In embodiments, the generating step S800 may include the sub-steps show in FIG. 8C. In embodiments, the process for generating the particle count information may begin step S800A. At step S800A, in embodiments, an inlet 308 of the particle detection payload 300 may ingest a first air sample at a first volumetric flow rate. In embodiments, the first air sample may include a plurality of atmospheric aerosol particles and a plurality of water vapor particles. In embodiments, the inlet 308 may be operatively connected to a wick 302 of the particle detection payload. In embodiments, the wick 302 may be a continuous wick running through each component of the condensation particle detection payload 300.

In embodiments, referring to FIG. 8C, the process for generating particle count information may continue with sub-step S800B. At step S800B, in embodiments, a conditioner 330 of the condensation particle detection payload 300 enclosing the wick 302 may cool the first air sample. In embodiments, the first air sample may be passed through the inlet 308 into the wick 302.

In embodiments, referring to FIG. 8C, the process for generating particle count information may continue with sub-step S800C. At step S800C, in embodiments, the conditioner 330 may condense the plurality of water vapor particles to form a a plurality of liquid water particles. In embodiments, the plurality of liquid water particles may be used as a water supply for the wick 302.

In embodiments, referring to FIG. 8C, the process for generating particle count information may continue with sub-step S800D. At step S800D, in embodiments, an initiator 340 of the condensation particle detection payload 300, which may enclose the wick 302, may heat the first air sample and the plurality of liquid water particles to supersaturate the first air sample. In embodiments, the first air sample and the plurality of liquid water particles may be passed from the conditioner stage to the initiator stage by the continuous wick 302. In embodiments, the heated initiator 340 surrounding the wet-walled wick 302 may serve to release water vapor from the wick 302 and supersaturate the air sample, which leads to particle growth.

In embodiments, referring to FIG. 8C, the process for generating particle count information may continue with sub-step S800E. At step S800E, in embodiments, a growth component (such as moderator 350 of the condensation particle detection payload 300 may enlarge the heated plurality of atmospheric aerosol particles. In embodiments, the plurality of liquid water particles may be recycled to the wick 302 in order to increase the useful life of the wick 302. In embodiments, the continuous wick allows the water supply to be recycled and returned via capillary action from the growth (moderator) stage to the initiator stage. In embodiments, by requiring no internal water reservoir, the condensation particle detection payload 300 is resilient to flooding and motion (i.e., it is solid state), and is capable of operating continuously whether titled or inverted during flight. Conventional particle counters less resistant to movement would not be well suited to operate while affixed to an unmanned aerial vehicle in flight.

In embodiments, referring to FIG. 8C, the process for generating particle count information may continue with sub-step S800E. At step S800E, in embodiments, a detector 306 of the condensation particle detection payload 300 may determine the first particle count information associated with the first air sample based on the enlarged plurality of atmospheric aerosol particles. In embodiments, the detector 306 may determine particle count information using the scattered light generated by a laser 322 of the condensation particle detection payload 300. In embodiments, the condensation particle detection payload 300 may be capable of detecting particle sizes ranging from 5 nanometers to 2.5 microns.

FIG. 7A is a graph depicting particle count data 700 and altitude data 701 measured by payloads mounted on an unmanned aerial vehicle 502 in accordance with embodiments of the present invention. In embodiments, the particle count information 700 may be measured periodically over a period of time. In embodiments, corresponding altitude information 701 may be measured periodically during the same period of time in order to correspond the particle information with altitude. In embodiments, the altitude information 701 may be measured and generated by the altimeter 548. The graph depicted in FIG. 7A illustrates a particle count of approximately 7,000 aerosol particles per unit volume during an aerial flight of an unmanned aerial vehicle 502 in the atmospheric boundary layer. This measurement can be compared to the corresponding GADS data for the same location during the same season, which is the conventional method of approximating the aerosol particle concentration. The GADS database for the same location and season indicated that the approximate aerosol particle concentration would be about 28,000 aerosol particles per unit volume. This difference in particle count between the conventional climatological data and the particle count measurements taken according to embodiments of the present invention shows the significant error created by using the conventional methods that is avoided using the present invention.

In embodiments, referring back to FIG. 8A, the process for measuring extinction information using the unmanned aerial vehicle 502 may continue with step S802. At step S802, in embodiments, a first humidity sensor 524-3 mounted on the unmanned aerial vehicle 502 and operatively connected to the central processing board 540 (data acquisition board), may generate first relative humidity information associated with a first relative humidity at the first altitude. In embodiments, the relative humidity information may be measured as a percentage. In embodiments, the humidity sensor 524-3 may be a sensor component of the anemometer 524. In embodiments, the humidity sensor 524-3 may be a separate sensor component operatively connected to the central processing board 540 and located inside or out of the base 520 enclosure. In embodiments, the humidity sensor 524-3 may be, for example, a SparkFun Humidity Sensor Breakout HIH-4030, or a comparable model. In embodiments, the relative humidity information may be measured periodically during the same period of time that the particle count information and altitude information is measured.

In embodiments, the relative humidity information may instead be calculated based on temperature measurement information, pressure measurement information and dew point measurement information generated by the weather sensor payload 570, and using known methods of calculating relative humidity information.

In embodiments, referring to FIG. 8A, the process for measuring extinction information using the unmanned aerial vehicle 502 may continue with step S804. At step S804, in embodiments, the condensation particle detection payload 300 may transmit the first particle count information associated with the range of altitudes measured during the period of time to the central processing board 540 (e.g., data acquisition board).

In embodiments, referring to FIG. 8A, the process for measuring extinction information using the unmanned aerial vehicle 502 may continue with step S806. At step S806, in embodiments, the humidity sensor 524-3 may transmit the relative humidity information to the central processing board 540 (e.g., data acquisition board).

Figure 6A:
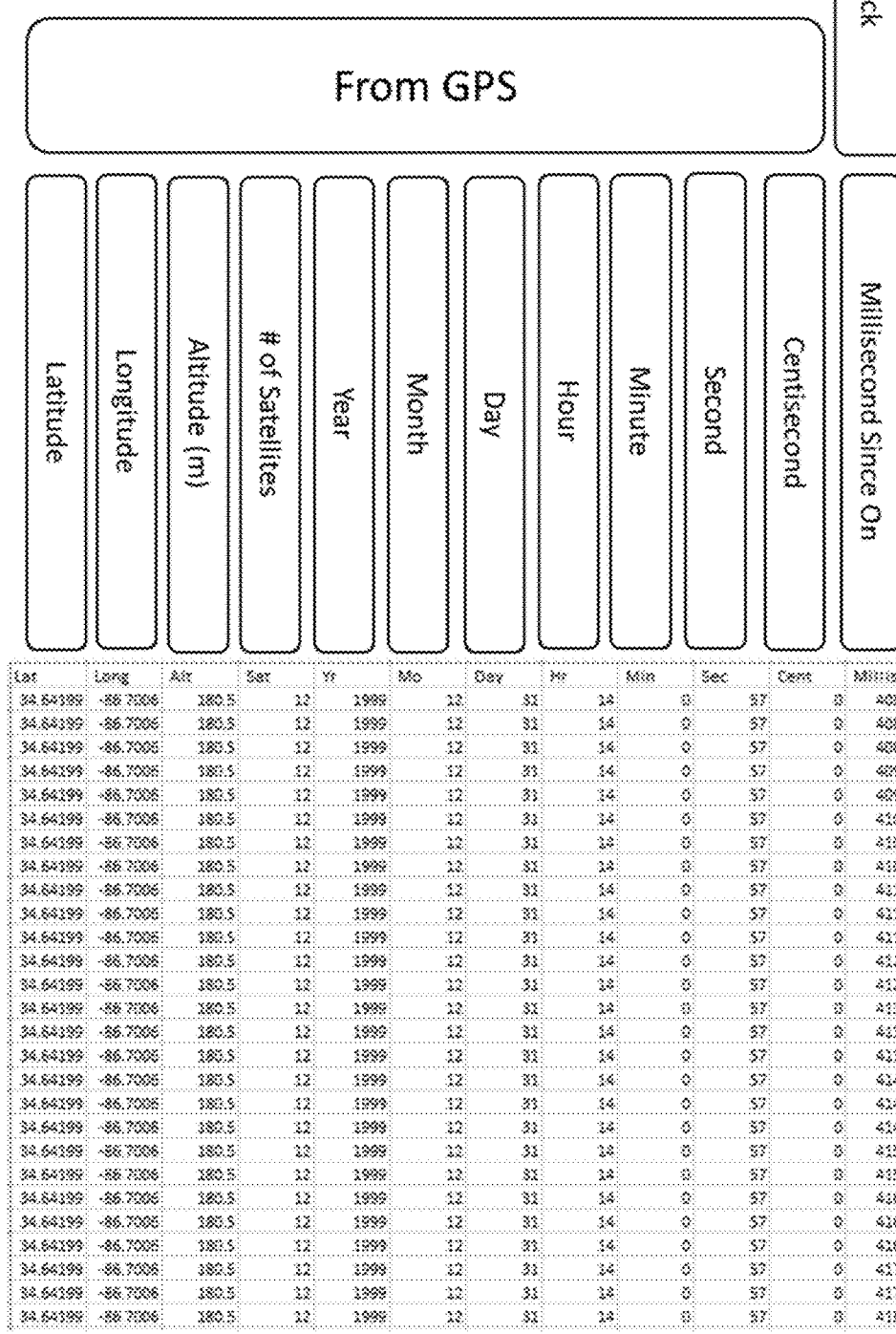
FIG. 6A is a table depicting exemplary sensor output information in accordance with embodiments of the present invention.
Figure 6B:
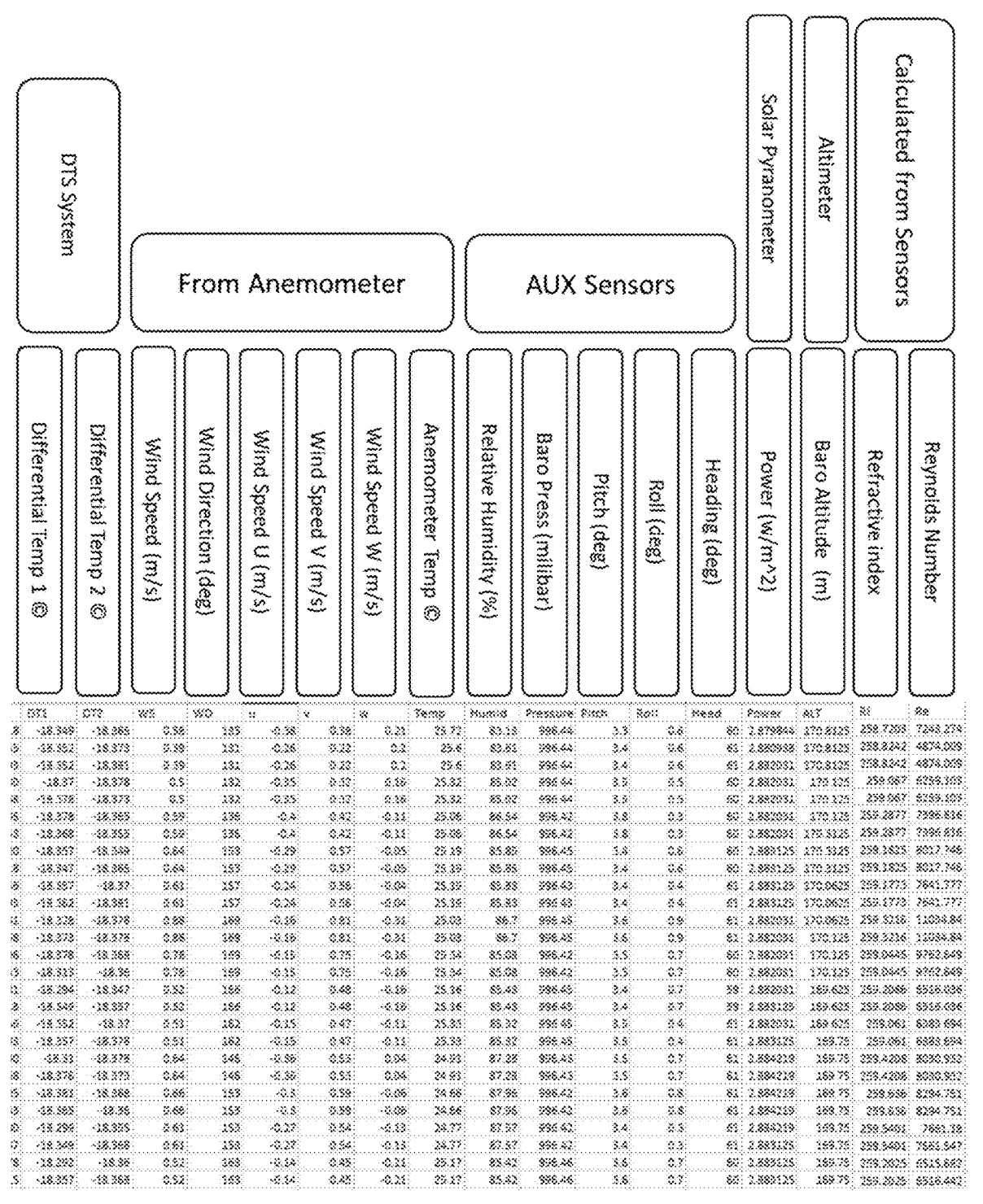

In embodiments, referring to FIG. 8A, the process for measuring extinction information using the unmanned aerial vehicle 502 may continue with step S808. At step S808, in embodiments, the central processing board 540 (e.g., data acquisition board) may store the first particle count information and the first relative humidity information in memory 542 operatively connected to the central processing board 540. FIG. 6A is a table depicting exemplary sensor output information in accordance with embodiments of the present invention, and FIG. 6B is a table depicting further exemplary sensor output information and sensor calculations in accordance with embodiments of the present invention. In embodiments, for example, in FIG. 6B the relative humidity information may be measured at a sampling rate and may correspond to a period of time and an altitude. FIG. 6C is a table depicting exemplary condensation particle detection payload 300 output information in accordance with embodiments of the present invention. In embodiments, the condensation particle detection payload 300 output information may be generated along with the corresponding altitude information measured by the altimeter 548 or the navigation system 604. In embodiments, the condensation particle detection payload 300 output information may include raw particle count information and other information relating to the operation of the particle counter including: particle number concentration (number/cm$^3$), temperature at the conditioner (C), temperature at the relative humidity sensor (C), temperature of the moderator (C), temperature of the optics head (C), temperature at the heat sink (C), measured dead time (fraction of interval*10000), flow rate (cm$^3$/min.), and raw particles counts at a lower detection threshold and high detection threshold, each generated during the same time period that the data illustrated in FIG. 6 was generated.

In embodiments, referring to FIG. 8A, the process for measuring extinction information using the unmanned aerial vehicle 502 may continue with step S810. At step S810, in embodiments, the central processing board 540 (e.g., data acquisition board) may determine particle size information based on the first relative humidity information. In embodiments, the central processing board 540 may instead transmit the relative humidity information to an external digital software system where calculations may take place. In embodiments, the calculations may be made by the central processing board 540 (e.g., data acquisition board) in flight in real time. Relative humidity in the atmospheric boundary layer may cause changes in particle size in the atmosphere. Relative humidity varies dramatically within the boundary layer, usually increasing from the surface to 100% or nearly so. This circumstance has a very strong effect on the aerosol size distribution—as a result of the relative humidity-driven water uptake by water-soluble aerosols—that in turn strongly affects directed energy propagation through the boundary layer. This effect is not captured when modeling with standard atmospheric data because the moisture (dewpoint) does not lapse realistically in standard atmospheres. Thus, relative humidity does not necessarily increase with height in a standard-atmosphere boundary layer. These changes in particle size cause an increase scattering effects of directed energy applications. In embodiments, the normalized radius-specific particle number density may be determined by the formula:

$$\frac{dN(r)}{d(\log r)} = \frac{N}{(2\pi)^{1/2}\log(\sigma)} \exp\left[-\frac{(\log r - \log r_M)^2}{2(\log \sigma)^2}\right], \quad \text{(Eq. 1)}$$

where dN(r)/d(log r) is the normalized radius-specific particle number density (or notated as ND), N is the total particle number density per unit volume and is normalized to 1. The $r_M$ value is the modal (or median) radius of a dry particle of a specific aerosol species, and σ is the standard deviation for the dry particle of the specific aerosol species. The standard deviation and modal radius values associated with a specific aerosol species may be taken from third party databases.

For moist-aerosol calculations, aerosol particle growth caused by humidity is factored into extinction calculations, even at relative humidity values far below saturation. In conventional systems, relative humidity is approximated and not able to be measured in real time at different altitudes along with the particle count. In embodiments, the normalized radius-specific particle number density may be used to determine particle size information. In embodiments, the particle size information (e.g., humidity-altered radius value $r(a_w)$) may be determined by obtaining the particle number density ND from Eq. 1 (using the dry $r_M$ and σ) and then solving for $r(a_w)$ using the humidity-specific $r_M$ and holding the particle number density ND constant. In embodiments, the particle size information $r(a_w)$ may be solved for by the formula:

$$\log r(a_w) = \pm\left[-\ln\left(ND\sqrt{2\pi}\log\sigma\right)^2\right]^{1/2} + \log r_M, \quad \text{(Eq. 2)}$$

where ND is dN/d(log r), σ is the standard deviation of particle radius, and $r_M$ is the modal radius for the given relative humidity. Note that the first term on the right side of Eq. 2 is negative when ND is calculated using a dry particle radius $r_0$ is less than 1 micron and is positive when $r_0$ is greater than or equal to 1 micron. In embodiments, aerosols may be considered to be dry if relative humidity is less 50%. For relative humidity of greater or equal to 50%, modal radii are interpreted from third party databases.

Figure 8B:
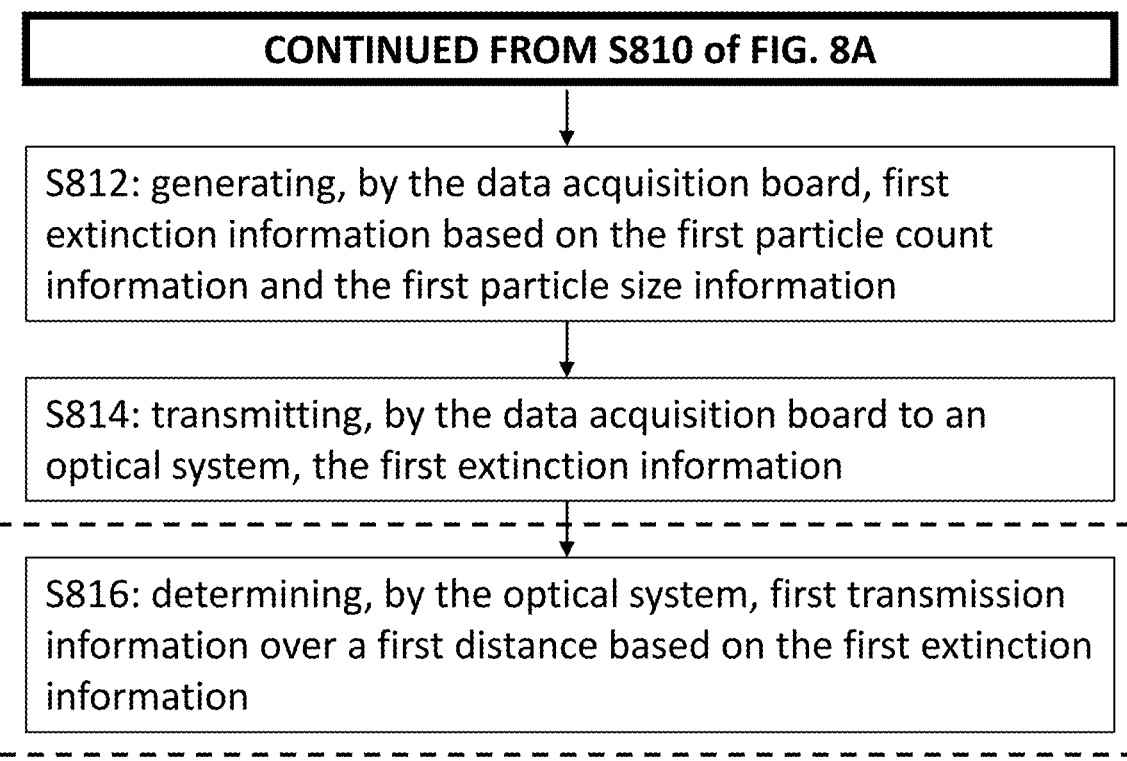

In embodiments, referring to FIG. 8B, the process for measuring extinction information using the unmanned aerial vehicle 502 may continue with step S812. At step S812, in embodiments, the central processing board 540 (e.g., data acquisition board) may generate extinction information based on the particle count information and the particle size information. In embodiments, the wavelength-specific normalized extinction, scattering, and absorption coefficients be,s,a(1) are obtained by integrating over the range of radii using the formula:

$$\beta_{e,s,a}(\lambda) = \int_{r_1}^{r_2} Q_{e,s,a}(n, \lambda, r)\pi r^2 \frac{dN(r)}{r\ln 10 d(\log r)} \approx \qquad \text{(Eq. 3)}$$
$$\sum_{i=r_{min}}^{r_{max}} Q_{e,s,a}(n, \lambda, r_i)\pi r_i^2 \frac{dN_i}{r_i\ln 10 d(\log r_i)}\Delta r_i$$

where $\beta_{e,s,a}(\lambda)$ are first wavelength-specific normalized extinction, scattering, and absorption coefficients, $Q_{e,s,a}(n, \lambda, r_i)$ are aerosol-constituent specific extinction, scattering, and absorption efficiency, and r is the modal radius associated with the first particle size information. In embodiments, the aerosol-constituent specific extinction, scattering, and absorption efficiency $Q_{e,s,a}(n, \lambda, r_i)$ may be obtained from a Wiscombe-Mie calculation. The Wiscombe-Mie calculation is a well-known Python module which is used to calculate light scattering for non-absorbing, partially-absorbing, or perfectly-conducting spheres. This code provides functions for calculating the extinction efficiency, scattering efficiency, backscattering, and scattering asymmetry. An exemplary Mie module can be found here: https://pypi.org/project/miepython/.

Figure 7A:
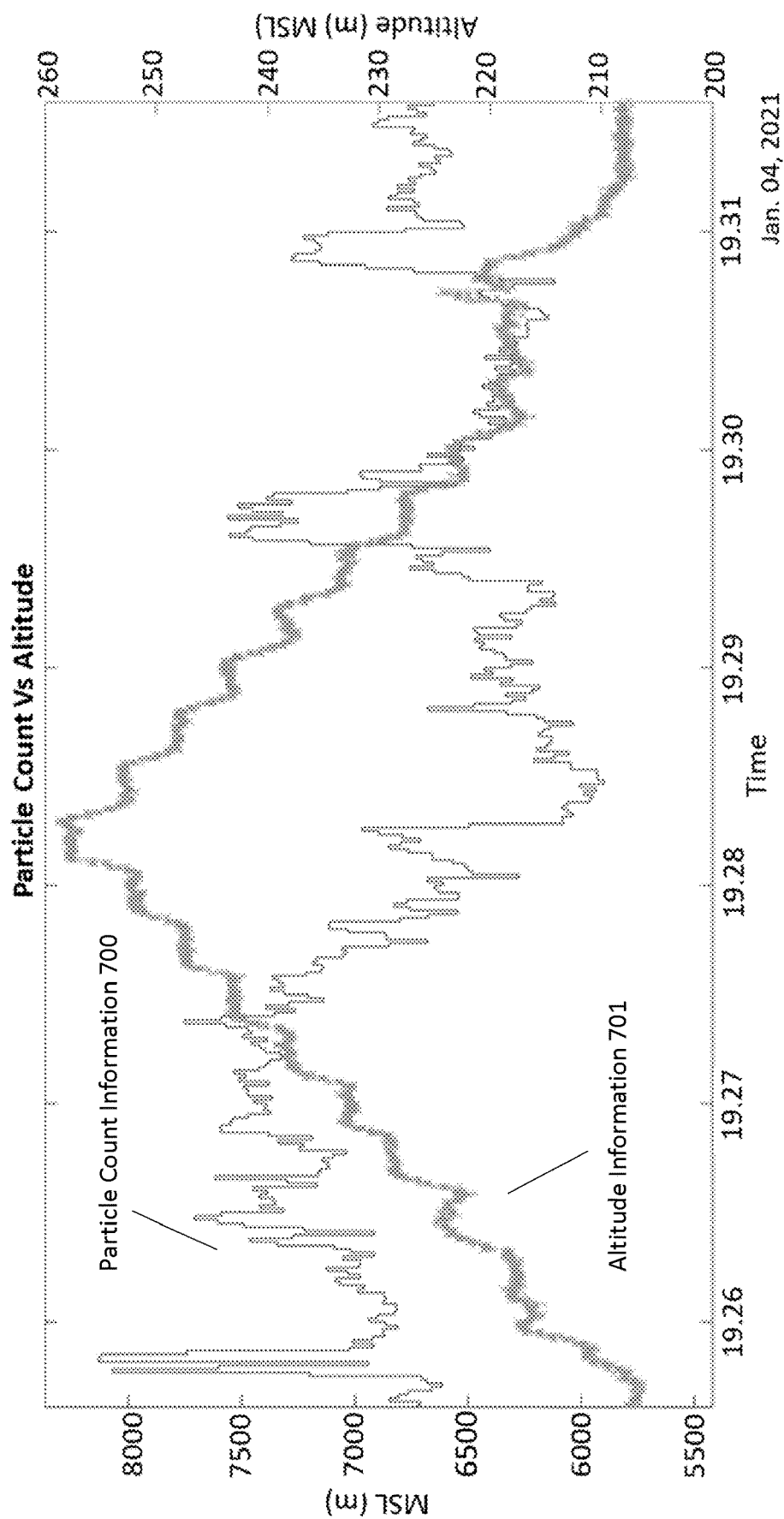
FIG. 7A is a graph depicting particle count data and altitude data measured by payloads mounted on an unmanned aerial vehicle in accordance with embodiments of the present invention.
Figure 7B:
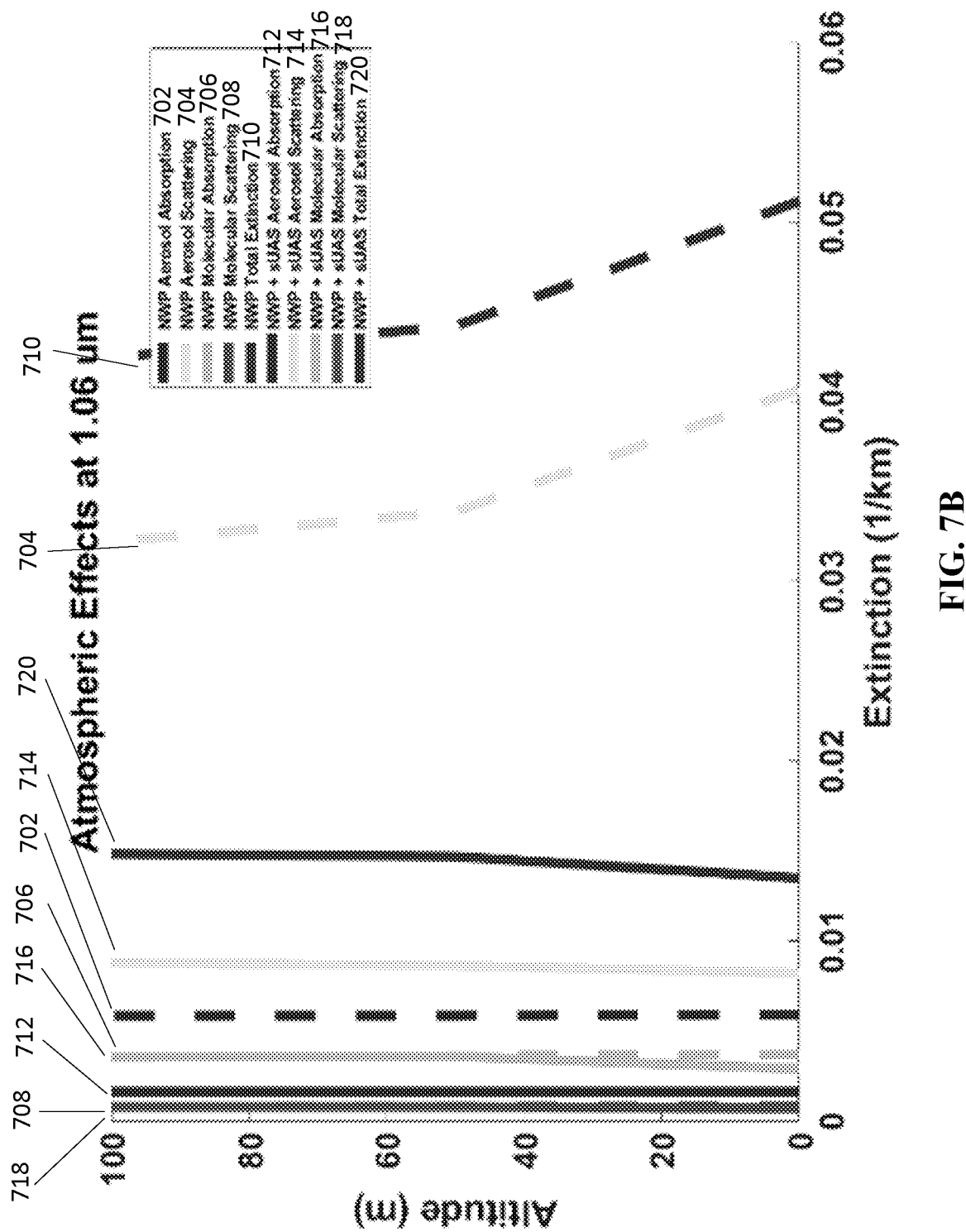
FIG. 7B is a graph depicting extinction data calculated at measured altitudes in accordance with embodiments of the present invention.

A comparison between the results of extinction measurements using a conventional atmospheric characterization method and the method described in accordance with embodiments of the present invention is shown in FIG. 7B. FIG. 7B is a graph depicting extinction data calculated at measured altitudes in accordance with embodiments of the present invention. In embodiments, the conventional method of calculating extinction used only the NWP data to generate extinction information. The resulting extinction information for the conventional method, i.e., NWP Total Extinction 710, which includes NWP Aerosol Absorption 702, NWP Aerosol Scattering 704, NWP Molecular Absorption 706, and NWP Molecular Scattering 708, provides extinction information that vastly differs from the method described in accordance with embodiments of the present invention. In embodiments, the extinction information generated using the particle count and particle size information in combination with the NWP data, i.e., NWP+SUAS Total Extinction 720, which includes NWP+SUAS Aerosol Absorption 712, NWP+SUAS Aerosol Scattering 714, NWP+SUAS Molecular Absorption 716, and NWP+SUAS Molecular Scattering 718, provides significantly more accurate extinction information than the conventional method. In embodiments, this more accurate extinction information may be provided to additional algorithms or calculations as inputs for determining transmittance and radiance, for example, to name a few. In embodiments, the extinction information (including aerosol effects for absorption and scattering) may be generated using the following pseudocode:
See Pseudocode Set 1

In embodiments, referring to FIG. 8B, the process for measuring extinction information using the unmanned aerial vehicle 502 may continue with step S814. At step S810, in embodiments, the central processing board 540 (e.g., data acquisition board) may transmit the extinction information to an optical system. In embodiments, the optical system may be mounted to the unmanned aerial vehicle 502. In embodiments, the optical system may be located remotely from the unmanned aerial vehicle. In embodiments, the extinction information may be transmitted wirelessly. In embodiments, the extinction information may be transmitted to the optical system by a wired connection, such as by using data port 554. In embodiments, data port 554 may be a USB cord port for example.

In embodiments, the process for measuring extinction information using the unmanned aerial vehicle 502 may end with step S814. In embodiments, referring to FIG. 8B, the process for measuring extinction information using the unmanned aerial vehicle 502 may continue with step S816. At step S816, in embodiments, the optical system may determine transmission information over a distance based on the extinction information. In embodiments, step S816 may include one more sub-steps as shown FIG. 8D. In embodiments, the process for determining transmission information may begin with step S816A. At step S816A, in embodiments, the optical system may generate optical depth information. In embodiments, optical depth information may be generated by using Beer's Law by the formula:

$$\tau(z_1, z_2) = \int_{z_1}^{z_2} \beta(z)dz. \qquad \text{(Eq. 4)}$$

where $\tau$ is the optical depth information, $\beta(z)$ is a layer volume extinction coefficient, and z is the geometric height. Beer's Law describes the optical length as the extinction over a distance. In embodiments, the layer volume extinction coefficient may be the sum of the absorption and scattering coefficients determined in step S812. In embodiments, the geometric height may be a horizontal distance to a target. In embodiments, the geometric height may be measured in meters.

Figure 8D:
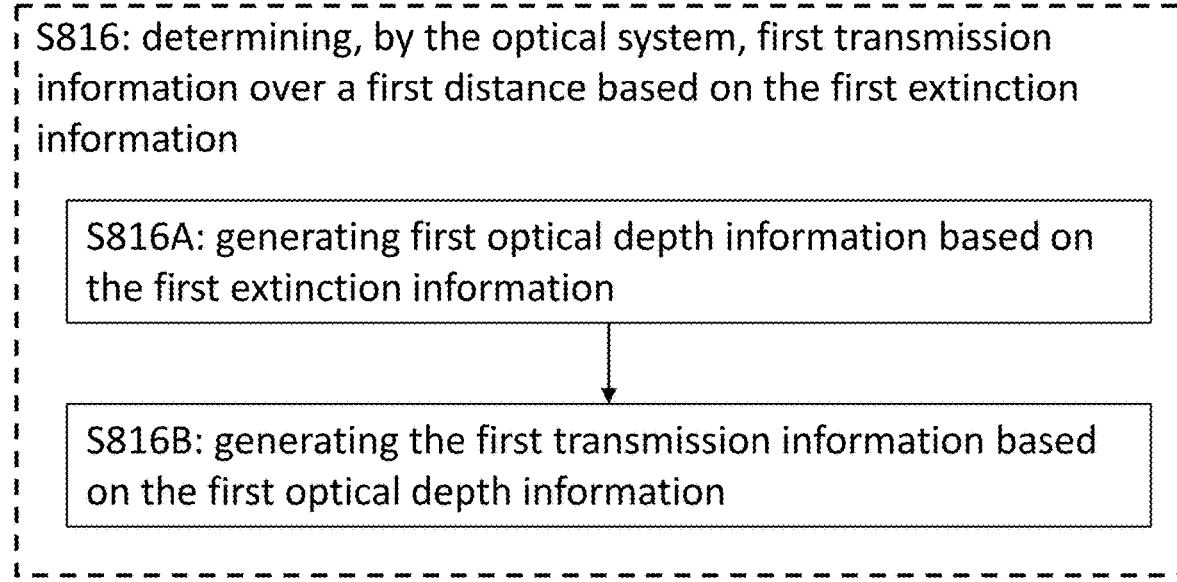

In embodiments, referring to FIG. 8D, the process for determining transmission information may continue with step S816B. At step S816B, in embodiments, the optical system may generate the transmission information based on the optical depth information. Direct path transmittance $\tau$ refers to the radiation that is directly transmitted without scattering and is calculated monochromatically via Beer's law. For the plane parallel assumption this is expressed as a function of the optical depth information, by the formula:

$$t(\tau) = e^{-\tau/|\cos\theta|}, \qquad \text{(Eq. 5)}$$

where t is the transmission information (or path transmittance), $\tau$ is the optical depth information, and $\theta$ is a first source angle of incidence upon a parallel plane. In embodiments, the transmission information may be useful for determining the effectiveness of a directed energy application such as a laser. In embodiments, in a laser application, the transmission information may indicate the ratio of the energy emitted by the optical system to by the energy received by the target. In embodiments, total single scatter spectral path radiance may be determined for each atmospheric layer as necessary.

Figure 7C:
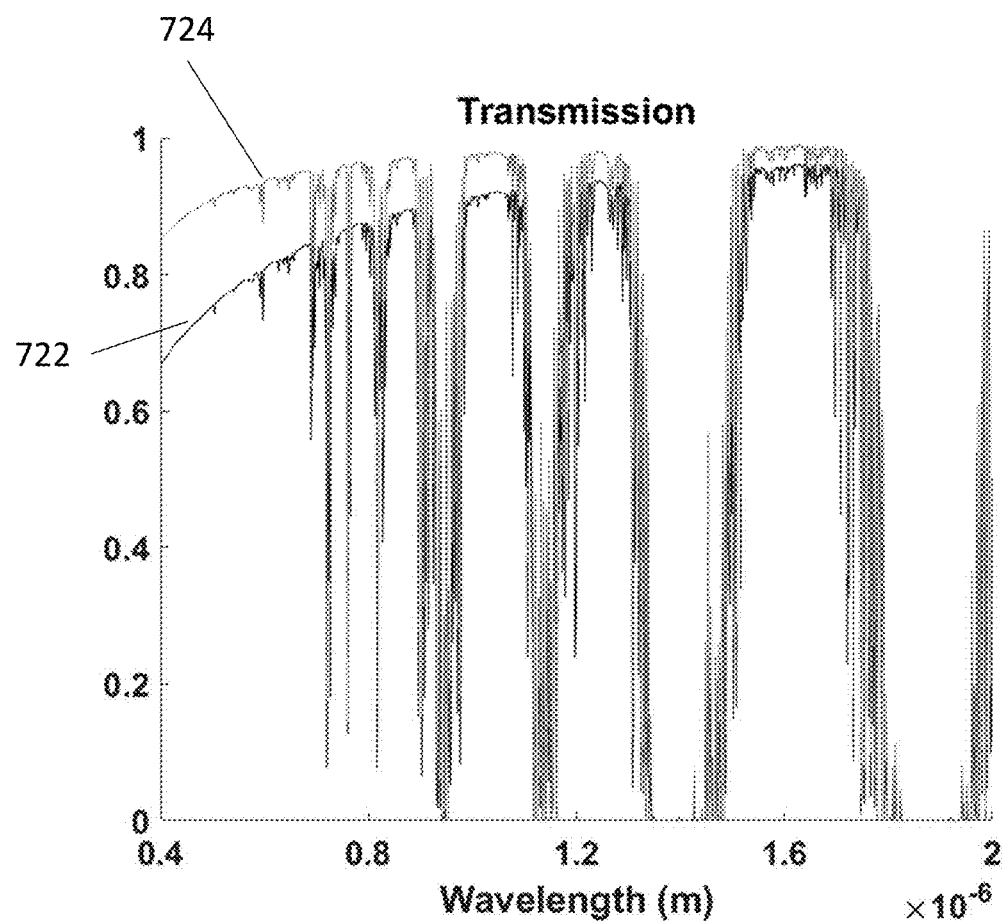
FIG. 7C is a graph depicting transmission data calculated across a range of wavelengths in accordance with embodiments of the present invention.

For example, FIG. 7C is a graph depicting transmission data calculated across a range of wavelengths in accordance with embodiments of the present invention. In the example show in FIG. 7C, using only the NWP default aerosol data 722 (the conventional method data used to determine extinction), at a wavelength of approximately 0.8 microns, the transmission was only 85%. In the same example, comparing to the transmission determined using the NWP+SUAS DEW Data 724 generated in accordance with embodiments of the present invention, the transmission at the same wavelength was approximately 95%. In embodiments, this difference in transmission may be important to the operational functionality of an optical system. As discussed, existing systems are not able as accurate because they are using modeled data, not in situ measurements to determine extinction. In the conventional stationary systems, which used ground level data as inputs, the particle count is assumed to be the same in the boundary layer, whereas the system described in embodiments of the present invention is able to measure particle count as a function of three-dimensional positioning.

Figure 7D:
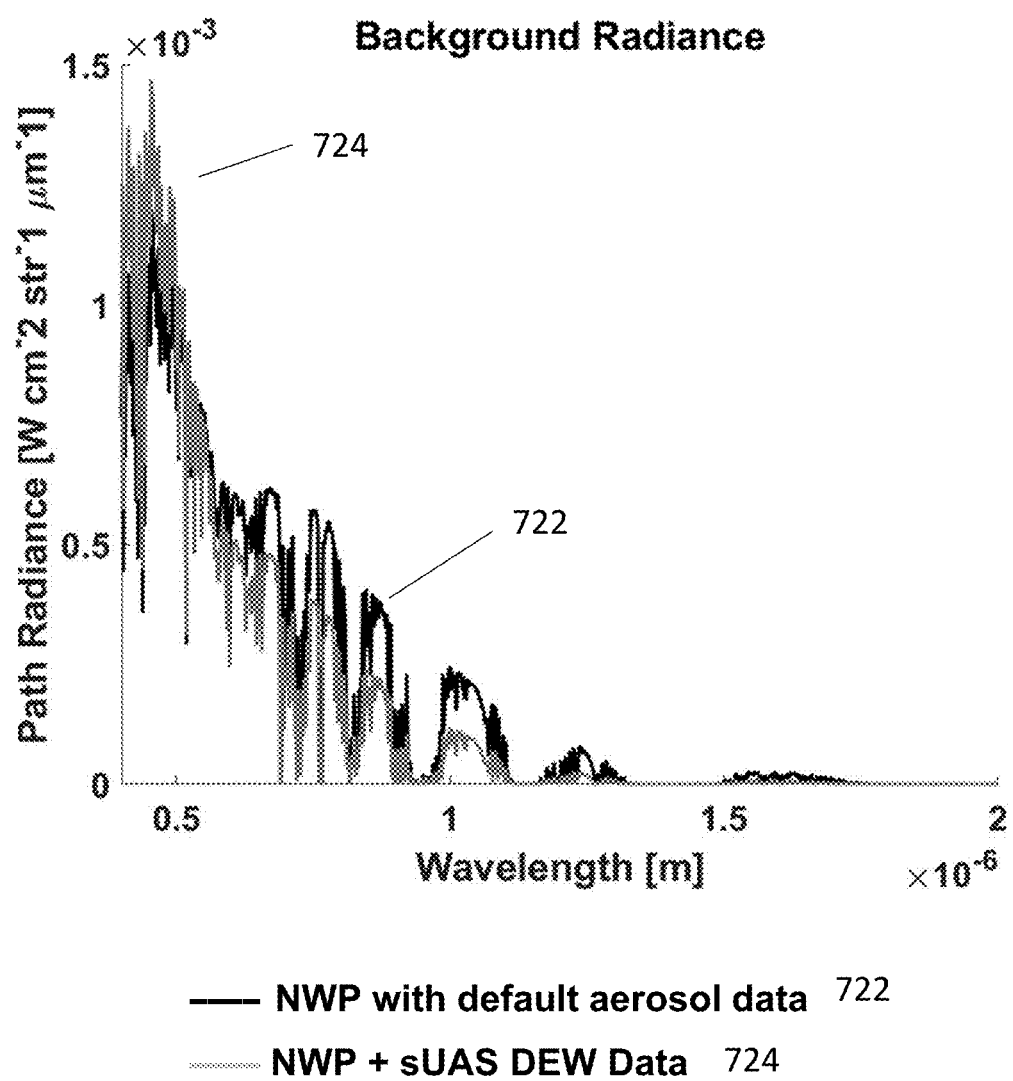
FIG. 7D is a graph depicting background radiance data calculated across a range of wavelengths in accordance with embodiments of the present invention.

In another example comparison of the use of extinction data generated in accordance with embodiments of the present invention, FIG. 7D is a graph depicting background radiance data calculated across a range of wavelengths in accordance with embodiments of the present invention. Background radiance is the radiance detected by a sensor above a nonreflective surface and is the result of backscattering to space by particles (in this case aerosols) in the atmosphere. In embodiments, the extinction information generated in accordance with embodiments of the present invention is used to more accurately determine the background radiance in directed energy applications. In embodiments, the radiance may be determined using the following pseudocode:

See Pseudocode Set 2

Figure 7E:
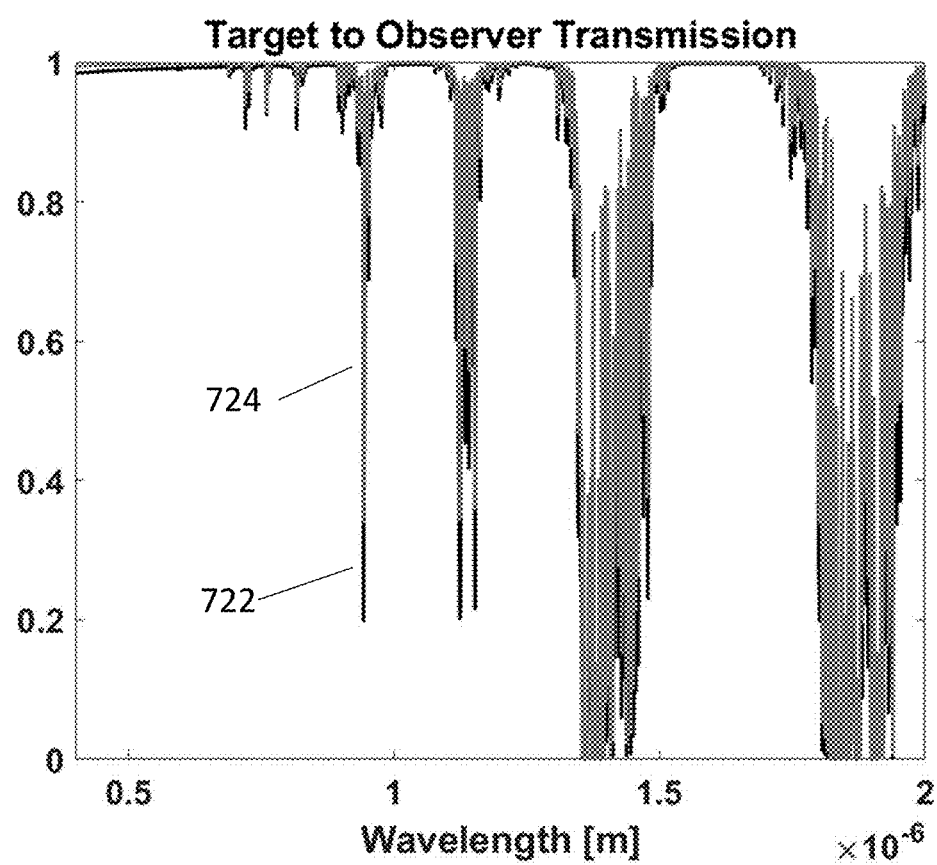
FIG. 7E is a graph depicting target-to-observer transmission data calculated across a range of wavelengths in accordance with embodiments of the present invention.
Figure 7F:
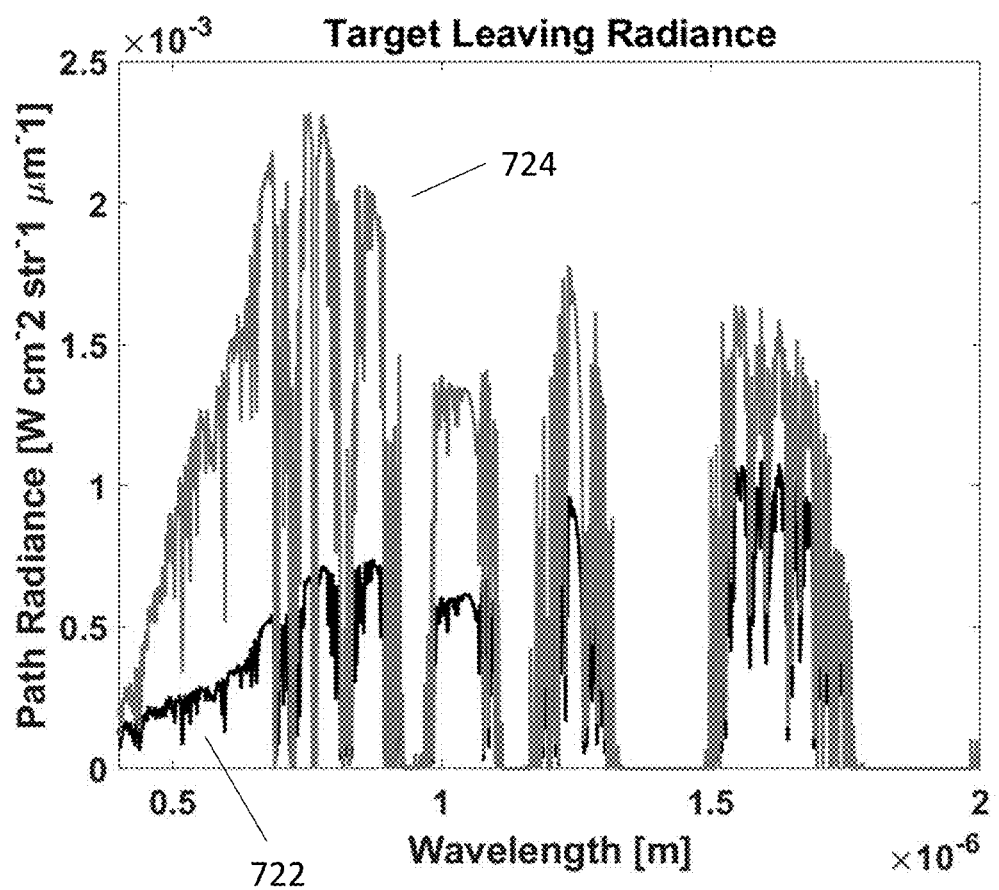
FIG. 7F is a graph depicting target leaving radiance calculated across a range of wavelengths in accordance with embodiments of the present invention.

Additionally, FIG. 7E is a graph depicting target-to-observer transmission data calculated across a range of wavelengths in accordance with embodiments of the present invention. Target to observer transmission indicates the transmission rate received from a target while factoring in atmospheric extinction information. In embodiments, this transmission information may be generated similarly to the process discussed with respect to FIG. 7C. FIG. 7F is a graph depicting target leaving radiance calculated across a range of wavelengths in accordance with embodiments of the present invention. Each of these figures depicts comparisons between the data generated using the default data and the data generated in accordance with embodiments of the present invention.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

Pseudocode Set 1

```
function [absorption, scattering, phaseFunction] = calcAerosolEffects(altitudes, temperature,
relativeHumidity, numberDensities, wavelength, opticalProperties, opticalDistros,
runLongWavelength, varargin)
  %CALCAEROSOLEFFECTS Calculate absorption, scattering, and phase fn
  % Calculate the absorption, scattering, and phase functions for the
  % given aerosol conditions.
  %
  % Inputs:
  %   temperature      [vector] = Temperature to use for computations (K)
  %   relativeHumidity [vector] = RH corresponding to temperature (%)
  %   numberDensities  [vector] = The number densities of aerosol
  %     types,[layers]x21 , cm^-3
  %   wavelength       [double] = Wavelength (m)
  %   runLongWavelength [bool] = Force wavelength over 40um to run
  %
  % Outputs:
  %   absorption    [vector] = Aerosol absorption (1/km)
  %   scattering    [vector] = Aerosol scattering (1/km)
  %   phaseFunction [vector] = Aerosol phase function (1/km)

% -- Constants
  LONG_WAVELENGTH_LIMIT    = 40e-6;
  STANDARD_RELATIVE_HUMIDITY = [0 50 70 80 90 95 98 99];
  RADIUS_PERMUTATION       = [3, 1, 4, 2];

% -- Find the total number of constituents
  % this will take into account the possibility that constituent types can
  % change as you go up the RH vect. I dont feel this is likely but it is a
  % case we ought to be able to handle.
  constituentsPresent = find(sum(numberDensities, 1));

% -- Zero Results
  %{
      Two conditions for zero results:
          1 - No constituents are present
          2 - Run long wavelength is turned off and all the wavelengths
              are above the valid limit for long wavelengths.
  %}
  hasConstituents    = ~isempty(constituentsPresent);
  runLongWavelength  = exist('runLongWavelength', 'var') && runLongWavelength;
  allAboveLimit      = all(LONG_WAVELENGTH_LIMIT < wavelength);
```

```
numberOfAltitudes  = length(altitudes);
phaseFunction      = zeros(numel(wavelength), numberOfAltitudes, 91);
absorption         = phaseFunction(:, :, 1);
scattering         = absorption; % zeros(numel(wavelength), numel(relativeHumidity));

if ~hasConstituents || (~runLongWavelength && allAboveLimit)
    return
end if ~runLongWavelength
    validWavelengths = (wavelength < LONG_WAVELENGTH_LIMIT);

wavelength = wavelength(validWavelengths);
else
    validWavelengths = true(size(wavelength));
end % -- Variables
% Look Up Tables
standardLut        = DataFiles.standardAerosolRecipies.getData();
waterRefractionLut = DataFiles.waterIndexOfRefraction.getData();

numberOfValidWavelengths = numel(wavelength);
calcPhaseFunction  = (nargout == 3);
angles = 0:2:180;
normFactor = pi./90.*sin(angles.*pi./180);

waterIndexOfRefractionTemp = waterRefractionLut.temperatureVectCelcius; % Data from LUT
waterIndexOfRefractionTemp = Temperature.CtoK(waterIndexOfRefractionTemp); % Convert C to K % Clip and Find Ranges
temperature        = temperature(1:find(altitudes<=100000,1,'last'));
temperature        = clip(temperature, waterIndexOfRefractionTemp);
relativeHumidity   = relativeHumidity(1:find(altitudes<=100000,1,'last'));
relativeHumidity   = clip(relativeHumidity, STANDARD_RELATIVE_HUMIDITY);
temperaturesPresent = findRange(temperature, waterIndexOfRefractionTemp);
rhPresent          = findRange(relativeHumidity, STANDARD_RELATIVE_HUMIDITY);

% Numbers of values
numberOfConstituents  = length(constituentsPresent);
numberOfTemperatures  = length(temperaturesPresent);
```

```
numberOfRelativeHumidities = length(rhPresent);
totalNumber          = numberOfValidWavelengths ...    % Total number of elements
                       * numberOfConstituents ...
                       * numberOfTemperatures ...
                       * numberOfRelativeHumidities;

% TODO: Find out what better variable names would be
monesW    = ones(1, numberOfValidWavelengths);
monesT    = ones(1, numberOfTemperatures);
monesR    = ones(1, numberOfRelativeHumidities);

if isempty(opticalProperties)
    % Extrack from LUT
    radiusMin  = standardLut.rMin(constituentsPresent, rhPresent);
    radiusMax  = standardLut.rMax(constituentsPresent, rhPresent);
    radiusMod  = standardLut.modalRadius(constituentsPresent, rhPresent);
    radiusSig  = standardLut.stdDev(constituentsPresent, rhPresent);

% Permute
    % Dimensions: 1 x #Constituents x 1 x #RelativeHumidities
    radiusMin  = permute(radiusMin, RADIUS_PERMUTATION);
    radiusMax  = permute(radiusMax, RADIUS_PERMUTATION);
    radiusMod  = permute(radiusMod, RADIUS_PERMUTATION);
    radiusSig  = permute(radiusSig, RADIUS_PERMUTATION);
else
    opticalProperties = opticalProperties(:,:,rhPresent);
    radiusMin = permute(squeeze(opticalProperties(constituentsPresent,2,:)), RADIUS_PERMUTATION);
    radiusMax = permute(squeeze(opticalProperties(constituentsPresent,3,:)), RADIUS_PERMUTATION);
    radiusMod = permute(squeeze(opticalProperties(constituentsPresent,4,:)), RADIUS_PERMUTATION);
    radiusSig = permute(squeeze(opticalProperties(constituentsPresent,5,:)), RADIUS_PERMUTATION);
end %% Compute Minimum required Cases %% -   Setup and Run Standard Aerosols
%        Constutuents Present:
%        1 - insoluble
%        2 - mineral (acc)   (desert dust)
%        3 - mineral (coa)   (desert dust)
```

```
%       4 - mineral (nuc)    (desert dust)
%       5 - mineral (transported)    (desert dust)
%       6 - sea salt (acc)
%       7 - sea salt (coa)
%       8 - soot
%       9 - sulfate droplets
%       10 - water-soluble
%       11-15 - MODTRAN
%       16-19 - NAM/ANAM (KPM 11 JUL 2008)
%       20-21 - BROWNOUT % For all constituants
lambdaFromIndex    = standardLut.wavelengths(:);
constituentIndices = standardLut.constituents(:, constituentsPresent);

% #Wavelengths x #Constituents x 1 x 1
constituentIndexOfRefraction = interp1(lambdaFromIndex, ...
                constituentIndices, ...
                wavelength(:) .* 1e6, ...
                'linear', 'extrap');
if ~isempty(opticalProperties) && length(wavelength) == 2 % This code needs to change such that opticalProperties is a matrix capable of interpolation just like constituentIndexOfRefraction above.
    constituentIndexOfRefraction(2,:) = squeeze(opticalProperties(constituentsPresent, 1,1))';%3rd dimentional reference can always be 1 size IOR is the same across all RH
end % For all temperatures present
lambdaMeters = waterRefractionLut.lambdaVectMeters(:);
indices      = waterRefractionLut.indicies(:, temperaturesPresent);

waterIndexOfRefraction = interp1(lambdaMeters, ...
                indices, ...
                wavelength(:), ...
                'linear', 'extrap');

waterIndexOfRefraction = permute(waterIndexOfRefraction, [1, 3, 2]);

% brownout
%   brownIDX = constituentsPresent == 20 | constituentsPresent == 21;
%   if any(brownIDX) && varargin{4}~=0    % GUI defined CIOR - replace computed values from above
%       constituentIndexOfRefraction(:, brownIDX) = varargin{4} - 1i * varargin{5};
```

```
%   end constituentIndexOfRefraction = ...
    constituentIndexOfRefraction(:, :, ones(1, numberOfTemperatures), ones(1, numberOfRelativeHumidities));

% NAM and ANAM
idx = constituentsPresent>=16 & constituentsPresent<=19;
if any(idx) % NAM or ANAM
    % convert from %rh to rh
    hum = shiftdim(STANDARD_RELATIVE_HUMIDITY(rhPresent)./100, -2); %1 x 1 x 1 x nRH
    Ga = ones(1, sum(idx));
    Gb = Ga;
    idx1 = constituentsPresent(idx)==16;
    idx2 = constituentsPresent(idx)==17;
    idx3 = ~idx1 & ~idx2;
    Ga(idx1) = 1.17;
    Gb(idx1) = 1.87;
    Ga(idx2) = 1.83;
    Gb(idx2) = 5.13;
    Ga(idx3) = 1.97;
    Gb(idx3) = 5.83;
    f0 = (Ga./Gb); % 1 x nConst x 1 x 1
    f = bsxfun(@minus, Ga, hum) ./ ...
        bsxfun(@times, Gb, (1-hum)); % 1 x nConst x 1 x nRH
    constituentIndexOfRefraction(:, idx, :, :) = ...
        bsxfun(@plus, waterIndexOfRefraction, ...
        bsxfun(@times, bsxfun(@minus, constituentIndexOfRefraction(:, idx, 1, 1), ...
        waterIndexOfRefraction), ...
        bsxfun(@rdivide, f0, f)));
    f = f.^(1/3);
    f = reshape(f(monesW, :, monesT, :), [totalNumber 1]);
else
    f = [];
end % Everything except NAM or ANAM
idx = ~idx;
if isempty(opticalProperties)
    constituentIndexOfRefraction(:, idx, :, :) = ...
        bsxfun(@plus, waterIndexOfRefraction, ...
        bsxfun(@times, bsxfun(@minus, constituentIndexOfRefraction(:, idx, 1, 1), ...
        waterIndexOfRefraction), ...
```

```
        permute(bsxfun(@rdivide, ...
            standardLut.modalRadius(constituentsPresent(idx), 1).^3, ...
            standardLut.modalRadius(constituentsPresent(idx), rhPresent).^3), ...
            [3 1 4 2]))); % nWL x nC x nT x nRH
    else
        constituentIndexOfRefraction(:, idx, :, :) = ...
            bsxfun(@plus, waterIndexOfRefraction, ...
            bsxfun(@times, bsxfun(@minus, constituentIndexOfRefraction(:, idx, 1, 1), ...
            waterIndexOfRefraction), ...
            permute(bsxfun(@rdivide, ...
            standardLut.modalRadius(constituentsPresent(idx), 1).^3, ... % this is the dry modal radius
            squeeze(opticalProperties(constituentsPresent(idx), 4, rhPresent)).^3), ...
            [3 1 4 2]))); % nWL x nC x nT x nRH
    end wlVect = wavelength(:)*1e6;

% [Const wl Rmin Rmax Rmod Rsig IOR]
    % only run Mie code for the unique inputs
    [MieInputs, ~, MieIDX] = unique([ ...
        reshape(constituentsPresent(monesW, :, monesT, monesR), [totalNumber 1]), ...
        reshape(wlVect(:, ones(1, numberOfConstituents), monesT, monesR), [totalNumber, 1]), ...
        reshape(radiusMin(monesW, :, monesT, :), [totalNumber 1]), ...
        reshape(radiusMax(monesW, :, monesT, :), [totalNumber 1]), ...
        reshape(radiusMod(monesW, :, monesT, :), [totalNumber 1]), ...
        reshape(radiusSig(monesW, :, monesT, :), [totalNumber 1]), ...
        constituentIndexOfRefraction(:), f(:)], 'rows');

nIter = size(MieInputs, 1);
    outPF = zeros(nIter, 91);
    outSca = outPF(:,1); % zeros(nIter, 1);
    outAbs = outSca; % zeros(nIter, 1);

if isempty(opticalDistros)
        MieMode = cell(1, size(numberDensities, 2));
        MieMode(16:19) = {'NAM'};
        MieMode(1:10) = {'lognormal'};
        MieMode(11:15) = {'modtran'};
        MieMode(20:end) = {'brownout'};
    else
        if size(opticalDistros,1) == 10
```

```
            MieMode = opticalDistros';
            MieMode(11:15) = {'modtran'};
            MieMode(16:19) = {'NAM'};
            MieMode(20:end) = {'brownout'};
        else
            MieMode = opticalDistros';
        end
    end for ii=1:nIter
        if calcPhaseFunction
            % last input is only used if NAM
            [outAbs(ii), outSca(ii), outPF(ii, :)] = ...
                runMieCode(MieMode{MieInputs(ii, 1)}, MieInputs(ii, 2), ...
                MieInputs(ii, 3), MieInputs(ii, 4), MieInputs(ii, 5), ...
                MieInputs(ii, 6), MieInputs(ii, 7), MieInputs(ii, end));
        else
            % last input is only used if NAM
            [outAbs(ii), outSca(ii)] = ...
                runMieCode(MieMode{MieInputs(ii, 1)}, MieInputs(ii, 2), ...
                MieInputs(ii, 3), MieInputs(ii, 4), MieInputs(ii, 5), ...
                MieInputs(ii, 6), MieInputs(ii, 7), MieInputs(ii, end));
        end
        %clear mex;
    end %    outAbs = reshape(outAbs(MieIDX), [numberOfWavelengths, numberOfConstituents,
numberOfTemperatures, numberOfRelativeHumidities]);
%    outSca = reshape(outSca(MieIDX), [numberOfWavelengths, numberOfConstituents,
numberOfTemperatures, numberOfRelativeHumidities]);

%% Prepare the Outputs
numberDensities = shiftdim( ...
    numberDensities(:, constituentsPresent), -1);
monesC = ones(1, numberOfConstituents);
monesA = ones(1, numberOfAltitudes);
types = permute(constituentsPresent(monesW, :, monesA), [1, 3, 2]);
temperatureVect = temperature(monesW, :, monesC);
rhVect = relativeHumidity(monesW, :, monesC);
% This is a hack. The actual wavelength vector is often not monotonically
% increasing, which causes interpolations to fail, so here we simply make
% its interpolation vector [1, 2, ..., n], where n is the number of elements
% in the wavelength vector. Since the wavelength dimension has the same lookup
```

```
% table and query points, replacing the original wavelength vector with the
% one just described does not change the results.
wlInterpVec = 1:numberOfValidWavelengths;
wlVect = wlInterpVec';
wlVect = wlVect(:, monesA, monesC);
gridVectors = {wlInterpVec, constituentsPresent, ...
    waterIndexOfRefractionTemp(temperaturesPresent), ...
    STANDARD_RELATIVE_HUMIDITY(rhPresent)};
xq = {wlVect(:), types(:), temperatureVect(:), rhVect(:)};
% catch cases where there are scalar values in the gridVector cell
% array
idx = cellfun(@numel,gridVectors) > 1;
gridVectors = gridVectors(idx);
xq = xq(idx);
if verLessThan('matlab', '7.13')
    F = cell(size(gridVectors));
    [F{:}] = ndgrid(gridVectors{:});
    interpFcn = @(X,V) interpn(X{:}, squeeze(V), xq{:});
else
    F = griddedInterpolant;
    F.GridVectors = gridVectors;
    interpFcn = @(F,V) loc_newInterp(F,squeeze(V),xq);
end
absorptionOut = interpFcn(F, ...
    reshape(outAbs(MieIDX), [numberOfValidWavelengths, numberOfConstituents,
numberOfTemperatures, numberOfRelativeHumidities]));
scatteringOut = interpFcn(F, ...
    reshape(outSca(MieIDX), [numberOfValidWavelengths, numberOfConstituents,
numberOfTemperatures, numberOfRelativeHumidities]));
absorptionOut = reshape(absorptionOut, numberOfValidWavelengths, numberOfAltitudes,
numberOfConstituents);
absorptionOut = sum(bsxfun(@times, numberDensities, absorptionOut), 3);
scatteringOut = reshape(scatteringOut, numberOfValidWavelengths, numberOfAltitudes,
numberOfConstituents);

if calcPhaseFunction
    outPF = bsxfun(@rdivide, outPF, outPF * normFactor');
    tempPhase = zeros(numberOfValidWavelengths *
numberOfAltitudes*numberOfConstituents, 91);
    for ii = 1:91 % in this case the loop is faster
        tempPhase(:, ii) = interpFcn(F, ...
            reshape(outPF(MieIDX, ii), [numberOfValidWavelengths, numberOfConstituents,
numberOfTemperatures, numberOfRelativeHumidities]));
```

```
        end
    aerosolPhaseFcnOut = sum(bsxfun(@times, bsxfun(@rdivide, ...
        scatteringOut, sum(scatteringOut, 3)), ...
        reshape(tempPhase, numberOfValidWavelengths, numberOfAltitudes,...
        numberOfConstituents, 91)), 3);
end scatteringOut = sum(bsxfun(@times, numberDensities, scatteringOut), 3);

%return the desired outputs
absorption(validWavelengths, :) = absorptionOut;
scattering(validWavelengths, :) = scatteringOut;
if calcPhaseFunction
    % multiply by 2 to convert from a 2*pi to a 4*pi steradian scatter
    % assumption (normalize to unity scatter across whole sphere):
    phaseFunction(validWavelengths, :, :) = aerosolPhaseFcnOut * 2;
end end %calcAerosolEffects function out = loc__newInterp(F, V, xq)

F.Values = V;
out = F(xq{:});

end
```

Pseudocode Set 2

```
function radianceStruct = calcRadianceV2(radianceProfile, observer, target, pathAlts, pathLengths)
    % Startup info we'll need throughout.
    PHASE_ANGLES = linspace(0, 180, 91);
    leedrProfile = radianceProfile.getLeedrProfile();
    earthRadius = leedrProfile.inputs.getEarthRadius();
    pathAlts = pathAlts';
    wavelengths = leedrProfile.inputs.getWavelength();

% Get information about the observer path.
    pathStruct = getPathInfo(observer, pathAlts, radianceProfile, pathLengths);

% Get information about the sun and moon.
    celestialStruct = getCelestialInfo(radianceProfile, pathStruct.LLA);
```

```
% Get information about the atmosphere.
atmosStruct = getAtmInfo(leedrProfile);

% Get information about the atmosphere along the observer path.
obsAtmStruct = getObsAtmInfo(atmosStruct, pathStruct, wavelengths);

% Save the path transmission to the output radiance struct.
radianceStruct.transmission = obsAtmStruct.cumTrans;

% Get information about the earth's surface
sfcStruct = getSurfaceInfo(radianceProfile, wavelengths);

% ================THERMAL RADIANCE=================
% Calculate Thermal Radiance of the atmosphere
slabAlbedosTmp = obsAtmStruct.slabAlbedos;
slabAlbedosTmp(obsAtmStruct.slabTrans < 0.2) = 0;
radianceStruct.atmosThermalRadiancePerLayer = (obsAtmStruct.cumTrans(1:end-1, :) .* ...
                (1 - obsAtmStruct.slabTrans) .* ...
                obsAtmStruct.blackBodyRadiation .* ...
                (1 - slabAlbedosTmp)) ./ 1e10;
radianceStruct.atmosThermalRadiance = (sum(obsAtmStruct.cumTrans(1:end-1, :) .* ...
                (1 - obsAtmStruct.slabTrans) .* ...
                obsAtmStruct.blackBodyRadiation .* ...
                (1 - slabAlbedosTmp),1)) ./ 1e10;

if pathStruct.earthIntersect
    % calculate cumulative transmission at the surface
    cumTransSurface = prod(obsAtmStruct.slabTrans, 1);

totalAlbedo = sum(obsAtmStruct.slabScat, 1) ./ sum(obsAtmStruct.slabExtinction, 1);

blackBodyRadiationSurface = planckFunction(wavelengths, sfcStruct.temperature)';
%[W/(m^2-sr-m)]
    radianceStruct.sfcThermalRadiance = ((1 - totalAlbedo) .* ...
                sfcStruct.emissivity .* ...
                blackBodyRadiationSurface .* ...
                cumTransSurface) ./ 1e10;
else
    radianceStruct.sfcThermalRadiance = 0;
end radianceStruct.totalThermalRadiance = radianceStruct.atmosThermalRadiance + ...
```

```
        radianceStruct.sfcThermalRadiance;
% ================END THERMAL RADIANCE=================

% get the angle between the sun and observer LOS
solarObsAngleDeg = acosd(dot(pathStruct.UnitXYZ, celestialStruct.SolarUnitXYZ));
lunarObsAngleDeg = acosd(dot(pathStruct.UnitXYZ, celestialStruct.LunarUnitXYZ));

% Get boolean array declaring paths from sun to observer-path points
% are valid.
[solar_goodGeoms, lunar_goodGeoms, solar_downRange, lunar_downRange] =
getGoodGeometries(pathStruct, earthRadius, atmosStruct, celestialStruct);

% Combine some of the above struct into substruct of obsAtmStruct to
% simplify the overall structure of the data, and make passing it to
% functions easier. We do this for phase and path because they are
% directly related to the observer path. The goodGeoms array is also
% added, due to it's correlation to the observer path.
obsAtmStruct.pathStruct = pathStruct;
obsAtmStruct.solar_goodGeoms = solar_goodGeoms;
obsAtmStruct.lunar_goodGeoms = lunar_goodGeoms;

if sum(solar_goodGeoms) > 1 || sum(lunar_goodGeoms) > 1
    % Get information about phase values of the atmosphere and along the
    % observer path.
    if sum(solar_goodGeoms) > 1
        solarPhaseStruct = getPhaseInfo(atmosStruct, PHASE_ANGLES, solarObsAngleDeg, pathStruct, obsAtmStruct);
        sunTransToSlab = getCelestialTransToSlab(pathAlts, solar_goodGeoms, solar_downRange, atmosStruct, earthRadius);
        sunTransToSlab = sunTransToSlab(2:end,:); % Ignore the obs position itself. We need transmission to the layers the obs is looking at.
        obsAtmStruct.solarPhaseStruct = solarPhaseStruct;
    else
        sunTransToSlab = zeros(length(pathAlts)-1, length(wavelengths));
    end
    if sum(lunar_goodGeoms) > 1
        lunarPhaseStruct = getPhaseInfo(atmosStruct, PHASE_ANGLES, lunarObsAngleDeg, pathStruct, obsAtmStruct);
        lunarTransToSlab = getCelestialTransToSlab(pathAlts, lunar_goodGeoms, lunar_downRange, atmosStruct, earthRadius);
        lunarTransToSlab = lunarTransToSlab(2:end, :);
        obsAtmStruct.lunarPhaseStruct = lunarPhaseStruct;
    else
```

```
            lunarTransToSlab = zeros(length(pathAlts)-1, length(wavelengths));
        end I0 = celestialStruct.I0;
        % Perform single scatter calculations
        singleScatterStruct = getSingleScattering(obsAtmStruct, I0, sunTransToSlab,
lunarTransToSlab, sfcStruct, celestialStruct, wavelengths);

if radianceProfile.getUseMultiScatter()
            if sum(solar_goodGeoms) > 1
                celestialStruct.solarSolidAngle = celestial.getSolidAngle(celestialStruct.solarDist,
AtmConstants.MEAN_SUN_RADIUS);
                solarRadiance = celestial.calcSolarDiscRadiance(wavelengths,
celestialStruct.solarTOAIrr, celestialStruct.solarSolidAngle)';
                obsAtmStruct.solarEnergyToSlab = bsxfun(@times, sunTransToSlab, solarRadiance);
%               celestialStruct.solarZenithDeg = celestialStruct.solarZenith .* (180/pi);
            end if sum(lunar_goodGeoms) > 1
                celestialStruct.lunarSolidAngle = celestial.getSolidAngle(celestialStruct.lunarDist,
AtmConstants.MEAN_MOON_RADIUS);
                lunarRadiance = celestial.calcLunarDiscRadiance(wavelengths,
celestialStruct.lunarSolidAngle, celestialStruct.lunarPhase)';
                obsAtmStruct.lunarEnergyToSlab = bsxfun(@times, lunarTransToSlab,
lunarRadiance);
%               celestialStruct.lunarZenithDeg = celestialStruct.lunarZenith .* (180/pi);
            end % Perform multiscatter diffusivity model calculations
            multiScatterStruct = getMultiScatter(obsAtmStruct, celestialStruct, leedrProfile,
sfcStruct);
        else
            multiScatterStruct.atmDiffuseEnergy =
zeros(size(singleScatterStruct.totalSingleScatter));
            multiScatterStruct.reflectedDiffuseEnergy =
zeros(size(singleScatterStruct.totalSingleScatter));
            multiScatterStruct.totalDiffuseEnergy =
zeros(size(singleScatterStruct.totalSingleScatter));

multiScatterStruct.solarAtmDiffuseEnergy =
zeros(size(singleScatterStruct.totalSingleScatter));
            multiScatterStruct.reflectedSolarDiffuseEnergy =
zeros(size(singleScatterStruct.totalSingleScatter));
```

```
          multiScatterStruct.totalSolarDiffuseEnergy =
zeros(size(singleScatterStruct.totalSingleScatter));

multiScatterStruct.lunarAtmDiffuseEnergy =
zeros(size(singleScatterStruct.totalSingleScatter));
          multiScatterStruct.reflectedLunarDiffuseEnergy =
zeros(size(singleScatterStruct.totalSingleScatter));
          multiScatterStruct.totalLunarDiffuseEnergy =
zeros(size(singleScatterStruct.totalSingleScatter));

multiScatterStruct.totalAtmDiffuseEnergy =
zeros(size(singleScatterStruct.totalSingleScatter));
          multiScatterStruct.totalReflectedDiffuseEnergy =
zeros(size(singleScatterStruct.totalSingleScatter));
          multiScatterStruct.totalDiffuseEnergy =
zeros(size(singleScatterStruct.totalSingleScatter));
     end
   else
      sunTransToSlab = zeros(length(pathStruct.pathLengths),length(wavelengths));
      lunarTransToSlab = zeros(length(pathStruct.pathLengths),length(wavelengths));
      singleScatterStruct.solarAtmSingleScatterPerLayer =
zeros(size(radianceStruct.atmosThermalRadiancePerLayer));
      singleScatterStruct.lunarAtmSingleScatterPerLayer =
zeros(size(radianceStruct.atmosThermalRadiancePerLayer));
      singleScatterStruct.solarAtmSingleScatter =
zeros(size(radianceStruct.atmosThermalRadiance));
      singleScatterStruct.lunarAtmSingleScatter =
zeros(size(radianceStruct.atmosThermalRadiance));
      singleScatterStruct.solarSurfaceSingleScatter =
zeros(size(radianceStruct.sfcThermalRadiance));
      singleScatterStruct.lunarSurfaceSingleScatter =
zeros(size(radianceStruct.sfcThermalRadiance));
      singleScatterStruct.totalSingleScatter = zeros(size(radianceStruct.sfcThermalRadiance));
      multiScatterStruct.atmDiffuseEnergy = zeros(size(singleScatterStruct.totalSingleScatter));
      multiScatterStruct.reflectedDiffuseEnergy =
zeros(size(singleScatterStruct.totalSingleScatter));
      multiScatterStruct.totalDiffuseEnergy =
zeros(size(singleScatterStruct.totalSingleScatter));
      multiScatterStruct.solarAtmDiffuseEnergy =
zeros(size(singleScatterStruct.totalSingleScatter));
      multiScatterStruct.reflectedSolarDiffuseEnergy =
zeros(size(singleScatterStruct.totalSingleScatter));
```

```
        multiScatterStruct.totalSolarDiffuseEnergy =
zeros(size(singleScatterStruct.totalSingleScatter));
        multiScatterStruct.lunarAtmDiffuseEnergy =
zeros(size(singleScatterStruct.totalSingleScatter));
        multiScatterStruct.reflectedLunarDiffuseEnergy =
zeros(size(singleScatterStruct.totalSingleScatter));
        multiScatterStruct.totalLunarDiffuseEnergy =
zeros(size(singleScatterStruct.totalSingleScatter));
        multiScatterStruct.totalAtmDiffuseEnergy =
zeros(size(singleScatterStruct.totalSingleScatter));
        multiScatterStruct.totalReflectedDiffuseEnergy =
zeros(size(singleScatterStruct.totalSingleScatter));
        multiScatterStruct.totalDiffuseEnergy =
zeros(size(singleScatterStruct.totalSingleScatter));
    end radianceStruct.singleScatterRadiance = singleScatterStruct;
    radianceStruct.multiScatterRadiance = multiScatterStruct;
    radianceStruct.totalPathRadiance = singleScatterStruct.totalSingleScatter +
multiScatterStruct.totalDiffuseEnergy + radianceStruct.totalThermalRadiance;

% Handle target radiance
    if target.use
        I0 = celestialStruct.I0;
        lunarI0 = celestialStruct.lunarI0;
        targetStruct = getTargetInfo(target, obsAtmStruct, atmosStruct, wavelengths);

sunTransToTgtSlabs = getSunTransToSlabTgt(flipud(targetStruct.targToObsAlts'),
celestialStruct, atmosStruct);
        lunarTransToTgtSlabs = getMoonTransToSlabTgt(flipud(targetStruct.targToObsAlts'),
celestialStruct, atmosStruct);

obs2targVec = abs(pathStruct.TrueXYZ) - abs(targetStruct.TrueXYZ);
        sun2targVec = abs(celestialStruct.SolarTrueXYZ) - abs(targetStruct.TrueXYZ);
        solarVecAngle = acosd(dot(obs2targVec,
sun2targVec)/(sqrt(sum(obs2targVec.*obs2targVec))*sqrt(sum(sun2targVec.*sun2targVec))))
;
        solarVecAngle = solarVecAngle*pi/180;
        moon2targVec = abs(celestialStruct.LunarTrueXYZ) - abs(targetStruct.TrueXYZ);
        lunarVecAngle = acosd(dot(obs2targVec,
moon2targVec)/(sqrt(sum(obs2targVec.*obs2targVec))*sqrt(sum(moon2targVec.*moon2tar
gVec))));
        lunarVecAngle = lunarVecAngle*pi/180;
```

```
% Calculate what percentage of the illuminated target is visible to
% the observer (target partial visibility) using the cosine rule.
% If the value is less than 0, clip to 0.
targetPV_solar = clip(cos(solarVecAngle), [0, 1], 'min');
targetPV_lunar = clip(cos(lunarVecAngle), [0, 1], 'min');

% Use equation for a sphere instead
%     targetPV = (1/pi)*(sin(vecAngle) + (pi - vecAngle) * cos(vecAngle));

% Target Atm Thermal Components
slabAlbedosTmp = targetStruct.slabAlbedoToObs;
slabAlbedosTmp(targetStruct.slabTransToObs < 0.2) = 0;
tgtCTrans = cumprod(targetStruct.slabTransToObs,1);
radianceStruct.tgtSlabThermal = tgtCTrans(1:end-1,:) .* ...
                (1 - targetStruct.slabTransToObs(2:end,:)) .* ...
                targetStruct.slabBlackbodyToObs(2:end,:) .* ...
                (1 - slabAlbedosTmp(2:end,:)) ./ 1e10;
radianceStruct.atmTargetThermal = sum(tgtCTrans(1:end-1,:) .* ...
                (1 - targetStruct.slabTransToObs(2:end,:)) .* ...
                targetStruct.slabBlackbodyToObs(2:end,:) .* ...
                (1 - slabAlbedosTmp(2:end,:))) ./ 1e10;
% Target Atm Phase Components
aeroPhase_solar = squeeze(interp1(PHASE_ANGLES, shiftdim(atmosStruct.aeroPhase, 2), solarVecAngle*180/pi))';
aeroPhase_solar = aeroPhase_solar ./ (4.0 * pi);

aeroPhase_lunar = squeeze(interp1(PHASE_ANGLES, shiftdim(atmosStruct.aeroPhase, 2), lunarVecAngle*180/pi))';
aeroPhase_lunar = aeroPhase_lunar ./ (4.0 * pi);

molecPhase_solar = interp1(PHASE_ANGLES, atmosStruct.molecPhase, solarVecAngle*180/pi) ./ (4.0 * pi);
molecPhase_lunar = interp1(PHASE_ANGLES, atmosStruct.molecPhase, lunarVecAngle*180/pi) ./ (4.0 * pi);

numerator_solar = aeroPhase_solar .* atmosStruct.aeroScat ...
            + molecPhase_solar .* atmosStruct.molecScat;

numerator_lunar = aeroPhase_lunar .* atmosStruct.aeroScat ...
            + molecPhase_lunar .* atmosStruct.molecScat;
if atmosStruct.useWx
```

```
        weatherPhase_solar = squeeze(interp1(PHASE_ANGLES,
shiftdim(atmosStruct.weatherPhase, 1), solarVecAngle*180/pi))';
        weatherPhase_solar = weatherPhase_solar / (4.0 * pi);
        numerator_solar = numerator_solar + weatherPhase_solar .* ...
            (atmosStruct.cloudScat + atmosStruct.rainScat);

weatherPhase_lunar = squeeze(interp1(PHASE_ANGLES,
shiftdim(atmosStruct.weatherPhase, 1), lunarVecAngle*180/pi))';
        weatherPhase_lunar = weatherPhase_lunar / (4.0 * pi);
        numerator_lunar = numerator_lunar + weatherPhase_lunar .* ...
            (atmosStruct.cloudScat + atmosStruct.rainScat);
    end numerator_solar = interp1(atmosStruct.altitudes, numerator_solar,
targetStruct.targToObsAlts, 'linear');
    numerator_lunar = interp1(atmosStruct.altitudes, numerator_lunar,
targetStruct.targToObsAlts, 'linear');

tgtPathSlabPhases_solar = numerator_solar ./ targetStruct.slabExtinctionToObs;
    tgtPathSlabPhases_lunar = numerator_lunar ./ targetStruct.slabExtinctionToObs;

% Target Atm Single Scatter
    radianceStruct.solarAtmTgtSSPerLayer = tgtCTrans(1:end-1,:) .* ...
                targetStruct.slabAlbedoToObs(2:end,:) .* ...
                tgtPathSlabPhases_solar(2:end,:) .* ...
                sunTransToTgtSlabs(2:end,:) .* ...
                (1 - targetStruct.slabTransToObs(2:end,:)) .* ...
                I0(ones(1, size(sunTransToTgtSlabs, 1)-1), :);

L_SS_Solar = sum(radianceStruct.solarAtmTgtSSPerLayer, 1) ./ 1e10;

radianceStruct.lunarAtmTgtSSPerLayer = tgtCTrans(1:end-1,:) .* ...
                targetStruct.slabAlbedoToObs(2:end,:) .* ...
                tgtPathSlabPhases_lunar(2:end,:) .* ...
                lunarTransToTgtSlabs(2:end,:) .* ...
                (1 - targetStruct.slabTransToObs(2:end,:)) .* ...
                lunarI0(ones(1, size(lunarTransToTgtSlabs, 1)-1), :);

L_SS_Lunar = sum(radianceStruct.lunarAtmTgtSSPerLayer, 1) ./ 1e10;

L_SS = L_SS_Solar + L_SS_Lunar;
    % One term that has not been considered is the target's reflection
    % of the earth's reflection. We only need it, though, if the target
```

```
% is above the observer and thus is able to reflect the earth.
if ~pathStruct.earthIntersect
    % One term we don't have is the transmission between the earth's
    % surface and the target. We can use that as a means of propagating
    % the earth's sfc reflection to the target, and then reflecting
    % that off of the target towards the observer.
    sToTAlts = linspace(0, target.altitude, length(pathStruct.altitudes));
    midSToTAlts = (sToTAlts(1:end-1) + sToTAlts(2:end)) / 2;
    sToTExt = interp1(atmosStruct.altitudes, atmosStruct.totalExt, midSToTAlts);
    sToTSca = interp1(atmosStruct.altitudes, atmosStruct.totalScat, midSToTAlts);

% convert from 1/km to 1/m
    extinctionCoefficients = sToTExt ./ 1000;

extinctionPerLayer = bsxfun(@times, extinctionCoefficients, diff(sToTAlts)');

% NaNs will occur when the path is beyond the defined atmosphere.
    % By setting the extinction to 0 at these layers, we essentially
    % assume that the atmosphere is a vacuum in them.
    extinctionPerLayer(isnan(extinctionCoefficients)) = 0;

% integrate the extinction along the entire path
    targPathExt = sum(extinctionPerLayer, 1) ./ sum(diff(sToTAlts)); % [1/m]

%We can use the height here as length, because we are considering
    %the vertical transmission from ground to target.
    targPathTrans = Path.calcTransmission(targPathExt, target.altitude);

blackBodyRadiationSurface = planckFunction(wavelengths, sfcStruct.temperature)'; %[W/(m^2-sr-m)]

totalAlbedo = sum(sToTSca, 1) ./ sum(sToTExt, 1);

sfcThermalRadiance = ((1 - totalAlbedo) .* ...
            sfcStruct.emissivity .* ...
            blackBodyRadiationSurface .* ...
            targPathTrans) ./ 1e10;
    solarSurfaceSingleScatter = ((sfcStruct.albedo ./ (2 * pi)) .* ...
            I0 .* sunTransToSlab(end, :) .* ...
            targPathTrans) ./ 1e10;
    lunarSurfaceSingleScatter = ((sfcStruct.albedo ./ (2 * pi)) .* ...
            lunarI0 .* lunarTransToSlab(end, :) .* ...
            targPathTrans) ./ 1e10;
```

```
        totalSfcRad = sfcThermalRadiance + solarSurfaceSingleScatter + 
lunarSurfaceSingleScatter;
        solarSfcRad = sfcThermalRadiance + solarSurfaceSingleScatter;
        lunarSfcRad = sfcThermalRadiance + lunarSurfaceSingleScatter;

targetReflectedRad = totalSfcRad .* targetStruct.transToObs;
        solarTargetReflectedRad = solarSfcRad .* targetStruct.transToObs;
        lunarTargetReflectedRad = lunarSfcRad .* targetStruct.transToObs;
    else
        targetReflectedRad = 0;
        solarTargetReflectedRad = 0;
        lunarTargetReflectedRad = 0;
        totalSfcRad = zeros(size(L_SS));
        solarSfcRad = zeros(size(L_SS));
        lunarSfcRad = zeros(size(L_SS));
        sfcThermalRadiance = zeros(size(L_SS));
    end %    L_SS = sum(singleScatterStruct.atmSingleScatterPerLayer(1:targetStruct.fgEndIdx,:), 1) ./ 1e10;
%    [tpalts, IA, IC] = unique((pathStruct.altitudes(2:end) + pathStruct.altitudes(1:end-1)) ./ 2);
    radianceStruct.L_TR_Solar = (I0.* targetPV_solar .* sunTransToTgtSlabs(1,:) .* targetStruct.transToObs) ./ 1e10;
    radianceStruct.L_TR_Lunar = (lunarI0.* targetPV_lunar .* lunarTransToTgtSlabs(1,:) .* targetStruct.transToObs) ./ 1e10;
    % TOTALS
    % Partial Solar+Lunar irradiance reflected off the target and transmitted to the
    % observer. Sometimes called "target-leaving radiance", though not exactly.
    % Exclusive of the target albedo, hence why the actual
    % target-leaving radiance is computed below.
    radianceStruct.L_TR = radianceStruct.L_TR_Solar + radianceStruct.L_TR_Lunar;
    % Radiance received at the observer aperture from tgt.
    % Excludes multi-scatter reflections off the target.
    radianceStruct.L_AP = radianceStruct.atmTargetThermal + ...
        (1- targetStruct.r_albedo) .* targetStruct.blackBody .* targetStruct.transToObs + ...
        L_SS + multiScatterStruct.totalDiffuseEnergy + ...
        radianceStruct.L_TR.*(targetStruct.r_albedo./(2*pi));
    % Radiance received at the observer aperture from tgt. Includes
    % multi-scatter from the atmosphere and multi-scatter reflections
    % off the target.
    radianceStruct.L_AP_MSRFL = radianceStruct.atmTargetThermal + ...
```

```
            (1-targetStruct.r_albedo) .* targetStruct.blackBody .* targetStruct.transToObs + ...
        L_SS + multiScatterStruct.totalDiffuseEnergy + ...
        radianceStruct.L_TR.*(targetStruct.r_albedo./(2*pi)) +
multiScatterStruct.totalDiffuseEnergy.*(targetStruct.r_albedo);
    % Radiance received at the observer aperture from tgt. Excludes all
    % multi-scatter.
    radianceStruct.L_AP_NOMS = radianceStruct.atmTargetThermal + ...
        (1-targetStruct.r_albedo) .* targetStruct.blackBody .* targetStruct.transToObs + ...
        L_SS + ...
        radianceStruct.L_TR.*(targetStruct.r_albedo./(2*pi));
    % Radiance received at the observer aperture from tgt. Includes
    % everything from L_AP, but also includes reflections of the
    % earth's surface off the target.
    radianceStruct.L_AP_MSSFCRFL = radianceStruct.atmTargetThermal + ...
        (1-targetStruct.r_albedo) .* targetStruct.blackBody .* targetStruct.transToObs + ...
        L_SS + multiScatterStruct.totalDiffuseEnergy + ...
        radianceStruct.L_TR.*(targetStruct.r_albedo./(2*pi)) +
multiScatterStruct.totalDiffuseEnergy.*(targetStruct.r_albedo) + ...
        targetReflectedRad.*(targetStruct.r_albedo./(2*pi));
    % Atmospheric scattered radiance between target and observer.
    radianceStruct.targetAtmScatter = L_SS + multiScatterStruct.totalDiffuseEnergy;
    % Atmospheric scattered radiance between target and observer
    % exclusive of multi-scatter contributions.
    radianceStruct.targetAtmScatterNoMs = L_SS;
    % Radiant light leaving the target and propagated to the observer.
    radianceStruct.targetLeavingRad = radianceStruct.L_TR.*(targetStruct.r_albedo./(2*pi)) +
multiScatterStruct.totalDiffuseEnergy.*(targetStruct.r_albedo);
    % Radiance light leaving the target and propagated to the observer,
    % but exclusive of the multi-scatter reflection
    radianceStruct.targetLeavingRadNoMSRFL =
radianceStruct.L_TR.*(targetStruct.r_albedo./(2*pi));
    % SOLAR ONLY
    radianceStruct.L_AP_Solar = radianceStruct.atmTargetThermal + ...
        (1-targetStruct.r_albedo) .* targetStruct.blackBody .* targetStruct.transToObs + ...
        L_SS_Solar + multiScatterStruct.totalSolarDiffuseEnergy + ...
        radianceStruct.L_TR_Solar.*(targetStruct.r_albedo./(2*pi));
    radianceStruct.L_AP_MSRFL_Solar = radianceStruct.atmTargetThermal + ...
        (1-targetStruct.r_albedo) .* targetStruct.blackBody .* targetStruct.transToObs + ...
        L_SS_Solar + multiScatterStruct.totalSolarDiffuseEnergy + ...
        radianceStruct.L_TR_Solar.*(targetStruct.r_albedo./(2*pi)) +
multiScatterStruct.totalSolarDiffuseEnergy.*(targetStruct.r_albedo);
    radianceStruct.L_AP_NOMS_Solar = radianceStruct.atmTargetThermal + ...
        (1-targetStruct.r_albedo) .* targetStruct.blackBody .* targetStruct.transToObs + ...
```

```
            L_SS_Solar + ...
        radianceStruct.L_TR_Solar.*(targetStruct.r_albedo./(2*pi));
    radianceStruct.L_AP_MSSFCRFL_Solar = radianceStruct.atmTargetThermal + ...
        (1-targetStruct.r_albedo) .* targetStruct.blackBody .* targetStruct.transToObs + ...
        L_SS_Solar + multiScatterStruct.totalSolarDiffuseEnergy + ...
        radianceStruct.L_TR_Solar.*(targetStruct.r_albedo./(2*pi)) +
multiScatterStruct.totalSolarDiffuseEnergy.*(targetStruct.r_albedo) + ...
        solarTargetReflectedRad.*(targetStruct.r_albedo./(2*pi));
    radianceStruct.targetAtmScatter_Solar = L_SS_Solar +
multiScatterStruct.totalSolarDiffuseEnergy;
    radianceStruct.targetAtmScatterNoMs_Solar = L_SS_Solar;
    radianceStruct.targetLeavingRad_Solar =
radianceStruct.L_TR_Solar.*(targetStruct.r_albedo./(2*pi)) +
multiScatterStruct.totalSolarDiffuseEnergy.*(targetStruct.r_albedo);
    radianceStruct.targetLeavingRadNoMSRFL_Solar =
radianceStruct.L_TR_Solar.*(targetStruct.r_albedo./(2*pi));
    % LUNAR ONLY
    radianceStruct.L_AP_Lunar = radianceStruct.atmTargetThermal + ...
        (1-targetStruct.r_albedo) .* targetStruct.blackBody .* targetStruct.transToObs + ...
        L_SS_Lunar + multiScatterStruct.totalLunarDiffuseEnergy + ...
        radianceStruct.L_TR_Lunar.*(targetStruct.r_albedo./(2*pi));
    radianceStruct.L_AP_MSRFL_Lunar = radianceStruct.atmTargetThermal + ...
        (1-targetStruct.r_albedo) .* targetStruct.blackBody .* targetStruct.transToObs + ...
        L_SS_Lunar + multiScatterStruct.totalLunarDiffuseEnergy + ...
        radianceStruct.L_TR_Lunar.*(targetStruct.r_albedo./(2*pi)) +
multiScatterStruct.totalLunarDiffuseEnergy.*(targetStruct.r_albedo);
    radianceStruct.L_AP_NOMS_Lunar = radianceStruct.atmTargetThermal + ...
        (1-targetStruct.r_albedo) .* targetStruct.blackBody .* targetStruct.transToObs + ...
        L_SS_Lunar + ...
        radianceStruct.L_TR_Lunar.*(targetStruct.r_albedo./(2*pi));
    radianceStruct.L_AP_MSSFCRFL_Lunar = radianceStruct.atmTargetThermal + ...
        (1-targetStruct.r_albedo) .* targetStruct.blackBody .* targetStruct.transToObs + ...
        L_SS_Lunar + multiScatterStruct.totalLunarDiffuseEnergy + ...
        radianceStruct.L_TR_Lunar.*(targetStruct.r_albedo./(2*pi)) +
multiScatterStruct.totalLunarDiffuseEnergy.*(targetStruct.r_albedo) + ...
        lunarTargetReflectedRad.*(targetStruct.r_albedo./(2*pi));
    radianceStruct.targetAtmScatter_Lunar = L_SS_Lunar +
multiScatterStruct.totalLunarDiffuseEnergy;
    radianceStruct.targetAtmScatterNoMs_Lunar = L_SS_Lunar;
    radianceStruct.targetLeavingRad_Lunar =
radianceStruct.L_TR_Lunar.*(targetStruct.r_albedo./(2*pi)) +
multiScatterStruct.totalLunarDiffuseEnergy.*(targetStruct.r_albedo);
```

```
        radianceStruct.targetLeavingRadNoMSRFL_Lunar =
radianceStruct.L_TR_Lunar.*(targetStruct.r_albedo./(2*pi));
        % Everything Else
        % Thermal Emissivity of target transmitted to observer
        radianceStruct.targetThermal = (1 - targetStruct.r_albedo) .* targetStruct.blackBody .*
targetStruct.transToObs;
        % Transmission between target and observer
        radianceStruct.atmTargetTrans = targetStruct.transToObs;
        % Thermal Emissions of the earth as well as Lunar and Solar
        % radiance reflected off the earth, transmitted to the target,
        % reflected off the target, and transmitted to the observer
        radianceStruct.targetSfcRef = targetReflectedRad.*(targetStruct.r_albedo./(2*pi));
        % Thermal Emissions of the earth as well as Solar
        % radiance reflected off the earth, transmitted to the target,
        % reflected off the target, and transmitted to the observer
        radianceStruct.targetSfcRef_Solar =
solarTargetReflectedRad.*(targetStruct.r_albedo./(2*pi));
        % Thermal Emissions of the earth as well as Lunar
        % radiance reflected off the earth, transmitted to the target,
        % reflected off the target, and transmitted to the observer
        radianceStruct.targetSfcRef_Lunar =
lunarTargetReflectedRad.*(targetStruct.r_albedo./(2*pi));
        % Thermal Emissions of the earth transmitted to the target,
        % reflected off the target, and transmitted to the observer
        radianceStruct.targetSfcRef_Therm =
sfcThermalRadiance.*targetStruct.transToObs.*(targetStruct.r_albedo./(2*pi));
        % Solar/Lunar radiance reflected off the earth, and Thermal
        % Emmissions of the earth, received at the target
        radianceStruct.targetSfcRad = totalSfcRad;
        % Solar radiance reflected off the earth, and Thermal
        % Emissions of the earth, received at the target
        radianceStruct.targetSfcRad_Solar = solarSfcRad;
        % Lunar radiance reflected off the earth, and Thermal
        % Emissions of the earth, received at the target
        radianceStruct.targetSfcRad_Lunar = lunarSfcRad;
        % Thermal Emissions of the earth received at the target
        radianceStruct.targetSfcThermal = sfcThermalRadiance;
    else
        radianceStruct.L_AP = [];
    end
end
```

What is claimed is:

1. An unmanned aerial vehicle comprising:
   a) a central body comprising a first enclosure housing:
      i. a flight controller configured to direct movement of the unmanned aerial vehicle;
      ii. a navigation system configured to generate three-dimensional position information of the unmanned aerial vehicle in three-dimensional space; and
      iii. a payload mounting interface;
   b) at least one motor operatively connected to the central body with at least one respective propeller, wherein each motor is operatively connected to the flight controller;
   c) a condensation particle detection payload mounted to the central body via the payload mounting interface, wherein the condensation particle detection payload is configured to generate first particle count information and first particle size information each including information regarding particles of sizes less than 10 microns; and
   d) a data acquisition board operatively connected to the condensation particle detection payload configured to obtain the first particle count information and to determine first extinction information at one or more locations in three-dimensional space based on the first where τ is first optical depth information, β(z) is a layer volume extinction coefficient, and z is a geometric height; and ii. generating the first transmission information by the formula:

$$t(\tau) = e^{-\tau/|\cos\theta|},$$

where t is the first transmission information, τ is the first optical depth information, and θ is a source angle of incidence upon a parallel plane.

9. The unmanned aerial vehicle of claim 8, wherein the first extinction information is determined based on the first particle count information and first particle size information.

10. The unmanned aerial vehicle of claim 9, wherein the first particle size information is generated by the steps of:
 1. generating, by a first humidity sensor mounted on the unmanned aerial vehicle and operatively connected to the data acquisition board, first relative humidity information associated with a first relative humidity;
 2. obtaining the first relative humidity information by the data acquisition board from the first humidity sensor; and
 3. determining the first particle size information based on the first relative humidity information.

11. The unmanned aerial vehicle of claim 10, wherein the first particle size information is determined by the formula:

$$\log r(a_w) = \pm\left[-\ln\left(ND\sqrt{2\pi}\log\sigma\right)2(\log\sigma)^2\right]^{1/2} + \log r_M,$$

where $r(a_w)$ is a first humidity-altered radius value, ND is a normalized radius-specific particle number density per unit volume value, σ is a first standard deviation, and $r_M$ is a modal radius value for the first relative humidity information.

12. A method for measuring extinction using an unmanned aerial vehicle comprising:
 a. generating, by a condensation particle detection payload operatively connected to a data acquisition board, both of which are mounted on the unmanned aerial vehicle, first particle count information associated with a first volumetric particle density at the condensation particle detection payload;
 b. generating, by a first humidity sensor mounted on the unmanned aerial vehicle and operatively connected to the data acquisition board, first relative humidity information associated with a first relative humidity;
 c. transmitting, from the condensation particle detection payload to the data acquisition board, the first particle count information;
 d. transmitting, from the first humidity sensor to the data acquisition board, the first relative humidity information;
 e. storing, in memory operatively connected to the data acquisition board, the first particle count information and the first relative humidity information;
 f. determining, by the data acquisition board, first particle size information based on the first relative humidity information, wherein the first particle size information is determined by the formula:

$$\log r(a_w) = \pm\left[-\ln\left(ND\sqrt{2\pi}\log\sigma\right)2(\log\sigma)^2\right]^{1/2} + \log r_M,$$

where $r(a_w)$ is a first humidity-altered radius value, ND is a normalized radius-specific particle number density per unit volume value, σ is a first standard deviation, and $r_M$ is a modal radius value for the first relative humidity information;

g. generating, by the data acquisition board, first extinction information based on the first particle count information and the first particle size information; and
 h. transmitting, by the data acquisition board to an optical system, the first extinction information.

13. The method of claim 12, wherein the generating step a) further comprises:
 i. ingesting, by an inlet of the condensation particle detection payload, a first air sample at a first volumetric flow rate, wherein the first air sample comprises a plurality of atmospheric aerosol particles and a plurality of water vapor particles, and wherein the inlet is operatively connected to a wick of the condensation particle detection payload;
 ii. cooling, by a conditioner of the condensation particle detection payload enclosing the wick, the first air sample;
 iii. condensing, by the conditioner, the plurality of water vapor particles to form a plurality of liquid water particles;
 iv. heating, by an initiator of the condensation particle detection payload enclosing the wick, the first air sample and the plurality of liquid water particles to supersaturate the first air sample;
 v. enlarging, by a growth component of the condensation particle detection payload, the heated plurality of atmospheric aerosol particles;
 vi. recycling the plurality of liquid water particles to the wick; and
 vii. determining, by a detector of the condensation particle detection payload, the first particle count information associated with the first air sample based on the enlarged plurality of atmospheric aerosol particles.

14. The method of claim 13, wherein the first particle count information is measured between 5 nanometers and 2.5 microns.

15. The method of claim 12, further comprising determining, by the optical system, first transmission information over a first distance based on the first extinction information, by the steps of:
 i. generating first optical depth information based on the first extinction information by the formula:

$$\tau(z_1, z_2) = \int_{z_1}^{z_2} \beta(z)dz.$$

where τ is the first optical depth information, β(z) is a layer volume extinction coefficient, and z is a geometric height; and ii. generating the first transmission information based on the first optical depth information by the formula:

$$t(\tau) = e^{-\tau/|\cos\theta|},$$

where t is the first transmission information, τ is the first optical depth information, and θ is a first source angle of incidence upon a parallel plane.

16. A method for measuring extinction using an unmanned aerial vehicle comprising:
  a. generating, by a condensation particle detection payload operatively connected to a data acquisition board, both of which are mounted on the unmanned aerial vehicle, first particle count information associated with a first volumetric particle density at the condensation particle detection payload;
  b. generating, by a first humidity sensor mounted on the unmanned aerial vehicle and operatively connected to the data acquisition board, first relative humidity information associated with a first relative humidity;
  c. transmitting, from the condensation particle detection payload to the data acquisition board, the first particle count information;
  d. transmitting, from the first humidity sensor to the data acquisition board, the first relative humidity information;
  e. storing, in memory operatively connected to the data acquisition board, the first particle count information and the first relative humidity information;
  f. determining, by the data acquisition board, first particle size information based on the first relative humidity information;
  g. generating, by the data acquisition board, first extinction information based on the first particle count information and the first particle size information, wherein the first extinction information is determined by the formula:

$$\beta_{e,s,a}(\lambda) = \int_{r_1}^{r_2} Q_{e,s,a}(n, \lambda, r)\pi r^2 \frac{dN(r)}{r\ln 10 d(\log r)} dt \approx \sum_{i=r_{min}}^{r_{max}} Q_{e,s,a}(n, \lambda, r_i)\pi r_i^2 \frac{dN_i}{r_i\ln 10 d(\log r_i)} \Delta r_i,$$

where $\beta_{e,s,a}(\lambda)$ are first wavelength-specific normalized extinction, scattering, and absorption coefficients, $Q_{e,s,a}(n, \lambda, r_i)$ are aerosol-constituent specific extinction, scattering, and absorption efficiency, and r is a modal radius associated with the first particle size information; and
  h. transmitting, by the data acquisition board to an optical system, the first extinction information.

17. The method of claim 16, further comprising determining, by the optical system, first transmission information over a first distance based on the first extinction information, by the steps of:
  a. generating first optical depth information based on the first extinction information by the formula:

$$\tau(z_1, z_2) = \int_{z_1}^{z_2} \beta(z) dz.$$

where $\tau$ is the first optical depth information, $\beta(z)$ is a layer volume extinction coefficient, and z is a geometric height; and
  ii. generating the first transmission information based on the first optical depth information by the formula:

$$t(\tau) = e^{-\tau/|\cos\theta|},$$

where t is the first transmission information, $\tau$ is the first optical depth information, and $\theta$ is a first source angle of incidence upon a parallel plane.

* * * * *